United States Patent [19]
Kenyon

[11] Patent Number: 5,210,820
[45] Date of Patent: May 11, 1993

[54] SIGNAL RECOGNITION SYSTEM AND METHOD

[75] Inventor: Stephen C. Kenyon, Stafford, Va.

[73] Assignee: Broadcast Data Systems Limited Partnership, Kansas City, Mo.

[21] Appl. No.: 517,835

[22] Filed: May 2, 1990

[51] Int. Cl.$^5$ ............................................. G01L 9/00
[52] U.S. Cl. ...................................................... 395/2
[58] Field of Search ...................... 364/487, 604, 513.5; 358/84; 381/41–43; 395/2

[56] References Cited

U.S. PATENT DOCUMENTS

| | | | |
|---|---|---|---|
| 3,919,479 | 11/1975 | Moon et al. .............................. | 358/84 |
| 4,053,710 | 10/1977 | Adrani et al. ........................... | 381/42 |
| 4,282,403 | 8/1981 | Sakoe ..................................... | 381/43 |
| 4,432,096 | 2/1984 | Bunge .................................... | 381/43 |
| 4,450,531 | 5/1984 | Kenyon et al. ........................ | 364/604 |
| 4,843,562 | 6/1989 | Kenyon et al. ........................ | 364/487 |

OTHER PUBLICATIONS

O'Shaughnessy, "Speaker Recognition", IEEE ASSP Magazine, Oct. 1986, pp. 4–17.

Primary Examiner—David D. Knepper
Attorney, Agent, or Firm—Fitzpatrick, Cella, Harper & Scinto

[57] ABSTRACT

Recognizing a signal begins by receiving the signal and sampling it at a plurality of sampling points to produce a plurality of signal values. A statistical moment of the signal is calculated using the signal values according to the formula:

$$(1/N) \sum_n \frac{(X(n) - \mu)^k}{\sigma^k}$$

where:
N = the number of sampling points;
n = 1 < n < N
X = the signal value of the signal at the sampling point;
$\mu$ = a mean of the signal values;
$\sigma$ = a standard deviation of the signal values; and
k = an integer greater than 1.

The calculated statistical moment is then compared with a plurality of stored signal identifications and the received signal is recognized as similar to one of the stored signal identifications. Preferably, the calculated statistical moment is used to create a feature vector which is quantized, and a weighted sum of the quantized feature vector is used to access a memory which stores the signal identifications.

80 Claims, 11 Drawing Sheets

| F \ L | 2 | 3 | 4 | 5 | 6 | 7 |
|---|---|---|---|---|---|---|
| 2 | 4 | 9 | 16 | 25 | 36 | 49 |
| 3 | 8 | 27 | 64 | 125 | 216 | 343 |
| 4 | 16 | 81 | 256 | 625 | 1,296 | 2,401 |
| 5 | 32 | 243 | 1,024 | 3,125 | 7,776 | 16,807 |
| 6 | 64 | 729 | 4,096 | 15,625 | 46,656 | 117,649 |
| 7 | 128 | 2,187 | 16,384 | 18,125 | 279,936 | 823,543 |
| 8 | 256 | 6,561 | 65,536 | 890,625 | 1,679,616 | 5,764,801 |

FIG. 7

SIGNAL RECOGNITION SYSTEM AND METHOD

BACKGROUND OF THE INVENTION

This invention relates to apparatus and method for recognizing signals, and in particular to apparatus and method for recognizing signals by utilizing statistical moments of sampled signal values to produce feature vectors, and to quantization of the feature vectors in order to compare the signal to a predetermined signal data base, and to derive the signal data base.

While the present invention will be described with respect to a system for recognizing broadcast signals such as music, it is to be understood that the teachings of this application are applicable to a broad spectrum of signal recognition fields.

The accurate recognition of broadcast signals is important to marketing executives, royalty collection agencies, music promoters, etc. It is well known that a wide variety of legal, economic, and social concerns require the regular monitoring of broadcast information. All such requirements share a common need for certain information such as which information is broadcast and when. In the prior art, broadcast stations were monitored manually by a plurality of listeners who would physically monitor the broadcast program and manually tabulate which information was broadcast at what time. Problems of reliability and cost have stimulated the effort toward realizing automated broadcast signal recognition systems. An initial automated method included encoding a unique cue signal in each song, and then monitoring each broadcast station to detect the cue signal. However, the associated encoding and decoding circuitry is expensive and complicated, and government regulatory agencies are adverse to providing additional bandwidth necessary for providing a large plurality of unique cue signals.

A further advance in the field of automated broadcast signal recognition is disclosed in U.S. Pat. No. 3,919,479 to Moon et al. In Moon et al., an audio signal is digitally sampled to provide a reference signal segment which is stored in a reference library. Then, when the audio signal is broadcast, successive portions thereof are digitized and compared with the reference segment in the library. The comparison is carried out in a correlation process which produces a correlation function signal. If the reference and broadcast signal segments are not the same, a correlation function with a relatively small amplitude results. On the other hand, if the reference and broadcast signal segments are relatively the same, a large correlation function signal is produced. The amplitude of the correlation function signal is sensed to provide a recognition signal when the amplitude exceeds a predetermined threshold level.

However, the single segment correlation system of Moon et al. is subject to signal drop-out which may disable the system altogether. Also, the Moon et al. system is relatively susceptible to time-axis variations in the broadcast information itself. For example, it is known that many disc-jockeys "compress" broadcast songs by speeding-up the drive mechanism. It is also known that other disc-jockeys regularly "compress" and/or "stretch" broadcast information to produce certain desired effects in the audience. Moon et al. attempts to overcome such time-axis variations by reducing the bandwidth of the broadcast signal by envelope-detecting the broadcast signal and providing envelope signals having substantially low, and preferably sub-audio, frequency signal components. It has been discovered that when the envelope signal at sub-audio frequencies is used during the correlation process, the digitally sampled waveforms are less sensitive to time-axis variations. However, the improvements which can be achieved by such a solution are very limited and will only operate for broadcast signals which have been "compressed" or "stretched" by a small amount. In addition, such a solution is subject to high false alarm rates. These disadvantages make the Moon et al. system less than desirable for a rapid, accurate, and inexpensive automatic broadcast signal recognition system.

A further advance in the automatic signal recognition field is disclosed in U.S. Pat. No. 4,450,531 to Kenyon et al. The same Mr. Kenyon is the sole inventor of the subject application, and the teachings of the '531 patent are hereby incorporated into this application by reference. The system of the '531 patent successfully addresses the reliability problems of a single segment correlation system and the time-axis variation problems experienced by prior systems. In the '531 patent, a plurality of reference signal segments are extracted from a program unit (song), digitized, Fourier transformed, and stored in a reference library in a frequency domain complex spectrum. The received broadcast signal is then prefiltered to select a frequency portion of the audio spectrum that has stable characteristics for discrimination. After further filtering and conversion to a digital signal, the broadcast signal is Fourier transformed and subjected to a complex multiplication process with reference signal segments to obtain a vector product. The results of the complex multiplication process are then subjected to an inverse Fourier transformation step to obtain a correlation function which has been transformed from the frequency to the time domain. This correlation function is then normalized and the correlation peak for each segment is selected and the peak spacing is compared with segment length. Simultaneously, the RMS power of the segment coincident with the correlation peak segment is sensed to determine the segment power point pattern. Thus, the '531 patent overcomes the disadvantages of a single segment correlation system by providing a plurality of correlation segments and measuring the distances between the correlation peaks. Where the distances match, the broadcast signal is declared as being similar to the signal segment stored in the reference library. In addition, the RMS value comparison operates to confirm the classification carried out using the signal segments.

To overcome the time-axis variation problem, the '531 patent utilizes an envelope detector and a bandpass filter for the broadcast information. However, the system according to the '531 patent is computationally very demanding. For example, performing the various multi-segment correlations requires a great deal of computer power. Since a multitude of segments are sampled, the system according to the '531 patent may take a good deal of time and require the use of expensive, powerful computers.

An automated approach to speech pattern recognition is disclosed in U.S. Pat. No. 4,282,403 to Sakoe. Sakoe discloses a speech recognition system in which a time sequence input of pattern feature vectors is inputted into a reference library. The received speech signal is then subjected to spectrum analysis, sampling, and digitization in order to be transformed into a time sequence of vectors representative of features of the speech sound at respective sampling instances. A time warping function may be used for each reference pattern by the use of feature vector components of a few channels. The time warping function for each reference pattern feature vector is used to correlate the input pattern feature vector and the reference pattern feature vector. The input pattern feature vector sequence is then compared with the reference pattern feature vector sequence, with reference to the time warping function, in order to identify the spoken word. However, the Sakoe system time warps the reference patterns rather than the input signal, and thus a plurality of patterns must be calculated for each reference pattern thus increasing the memory and computational demands of the system.

A further signal recognition system is disclosed in U.S. Pat. No. 4,432,096 to Bunge. In Bunge, sounds or speech signals are converted into an electrical signal and broken down into several spectrum components in a filter bank. These components are then integrated over a short period of time to produce the short-time spectrum of the signal. The spectral components of the signal are applied to a number of pattern detectors which apply an output signal only if the short-time spectrum corresponds to the pattern adjusted in the relevant pattern detector. Each pattern detector has two threshold detectors which supply a signal if the applied input lies between the adjustable thresholds. Thus, the pattern detectors supply an output signal only if all threshold value detectors are activated. For each sound of speech, a pattern detector is provided. When a series of sounds is recognized, the series of addresses of the pattern detectors which have successfully generated an output signal are stored and subsequently applied to the computer for comparison. It can be readily appreciated that such a system requires a number of pattern detectors and a corresponding powerful computation device. In addition, while the Bunge system uses a filter bank to provide a low frequency output signal which is relatively less sensitive to time-axis variations, the Bunge system is still subject to time distortion problems and a high false alarm rate.

A recently commercialized automatic broadcast signal recognition system is disclosed in U.S. Pat. No. 4,843,562 to Kenyon et al. Again, the same Mr. Kenyon is the sole inventor of the subject application, and the teachings of the '562 patent are incorporated herein by reference. In fact, specific teachings from the '562 patent will be incorporated in further portions of this specification. The '562 patent describes a two-stage (coarse and fine) classification system using fewer processor resources. According to the '562 patent, the broadcast signal is bandpass filtered, rectified, and lowpass filtered to provide a plurality of low bandwidth waveforms. The waveforms are sampled and the samples are used to generate a spectragram which is then compared with a plurality of reference spectragrams stored in a first stage reference library. The first stage reference spectragrams are then queued in order of their similarity to the generated spectragram. Next, a plurality of second stage reference patterns, which correspond to the queued first stage reference spectragrams, are correlated with one of the analyzed waveforms in the queueing order established previously. A correlation value is provided for each second stage reference pattern stored in the second stage reference library. When it is determined that a correlation value exceeds a threshold value, a recognition is declared and the broadcast signal is classified as similar to the second stage reference pattern whose correlation value exceeds the threshold. The analyzed waveform used in the second stage classification is time warped to account for speed fluctuations in the broadcast signal.

While the system according to the '562 patent is successful, it is somewhat limited in its ability of recognizing a large number of songs. For example, the system according to the '562 patent is capable of recognizing any of 600 songs on a single channel with high reliability. The system can simultaneously monitor 5 different channels. However, a system which could identify any one of three thousand songs on each of five simultaneously broadcast stations with high reliability would provide a very attractive and commercially successful signal recognition system. Further, the system according to the '562 patent required approximately 64 seconds to detect and classify a broadcast song. It is desired to reduce this time to 28 seconds to allow for the identification of shorter duration recordings such as advertisements. While increasing performance, it is important to retain the desirable compact architecture of the '562 patent.

Thus, what is needed is an improved system for accurately recognizing and classifying a large number of unique broadcast signals on a plurality of broadcast channels simultaneously and with high reliability. The system must be small, inexpensive, and easy to operate.

SUMMARY OF THE INVENTION

The present invention is designed to overcome the disadvantages of known automatic broadcast signal recognition systems while at the same time satisfying the objectives discussed above. Furthermore, the present invention has application to a wide variety of signal recognition fields, and not just to the recognition of broadcast signals.

The present inventor has discovered an improved method of signal recognition in which a signal is received and sampled at a plurality of sampling points to produce a plurality of signal values. A statistical moment of the signal values is then calculated according to the formula:

$$(1/N) \sum_n \frac{(X(n) - \mu)^k}{\sigma^k}$$

where:

N = the number of sampling points;

n = 1 < n < N;

X = the signal value of said signal at the sampling point;

$\mu$ = a mean of the signal values;

$\sigma$ = a standard deviation of the signal values k = an integer greater than 1;

The calculated statistical moment is compared with a plurality of stored signal identifications and the received signal is then recognized as being similar to one of the stored signal identifications.

Preferably, the received signal is bandpass filtered, rectified, and lowpass filtered to provide a plurality of low frequency waveforms. Then, the low frequency waveforms are combined into a plurality of linear combinations thereof. Each linear combination is then sampled to produce the plurality of signal values which are used to calculate the statistical moment.

Preferably, two statistical moments (skew and kurtosis) are calculated for the sampled values of each linear combination. A plurality of feature vectors ma then be derived, each feature vector comprising the skew and kurtosis values for all linear combinations within a predetermined sampling time period.

Each feature vector may then be quantized by replacing the floating point values of skew and kurtosis with single integers in accordance with a predetermined quantization pattern. After quantization, a weighted sum of the quantized vector may be calculated using a non-decimal radix. The weighted sum value may then be used to address a data base which stores signal identifications in accordance with the address.

The present invention also proposes a system for creating the signal data base which is accessed in order to recognize the received signal. The process of creating the data base is very similar to the process of recognizing the signal noted above. However, the target signal is first analyzed to determine a spectrally distinct portion thereof. The spectrally distinct portion of the signal is then bandpass filtered, rectified, and lowpass filtered to produce the low frequency waveforms from which a plurality of linear combinations are derived. The linear combinations of the spectrally distinct portion are then subjected to a modified sampling procedure whereby each linear combination is sampled a number of times with a moving window. The sampled values are then used to calculate skew and kurtosis, thus producing a plurality of reference feature vectors for the spectrally distinct portion of the signal.

The plurality of feature vectors are quantized in order to make their values more distinctive by spreading the distances between the vector in the feature hyperspace. Two procedures for quantization are possible. First, a non-overlap quantization scheme can be adopted whereby the feature vector signal value population is evenly divided into a plurality of segments, for example 5. Then, each value of the skew or kurtosis in each feature vector is plotted and assigned one of the five values. Thus, a plurality of quantized vectors are produced for each sampled signal. An overlapping method of quantization is also possible whereby the signal value population of the skew and kurtosis are divided into a plurality of overlapped areas wherein a skew or kurtosis value may be assigned to two areas. Each feature vector is then plotted and two quantized vectors are produced, since each skew or kurtosis value is capable of assuming two values. The two quantized feature vectors are then permutated to provide a further plurality of quantized feature vectors for the reference data base.

Whatever quantizing scheme is adopted, preferably, a weighted sum of each quantized vector is produced using a non-decimal radix. The weighted sum is then used as an address to access a data base wherein a pointer is stored, the pointer pointing to a further data base location where the target signal's identification code is stored.

BRIEF DESCRIPTION OF THE DRAWINGS

The advantageous features of the present invention will be readily understood from the following description o the presently preferred exemplary embodiment when taken together with the attached drawings in which:

FIG. 7 is a vector quantization table showing the number of distinct identities for a given number of quantization levels and a given number of features;

DETAILED DESCRIPTION OF THE PRESENTLY PREFERRED EXEMPLARY EMBODIMENT

Figure 1:
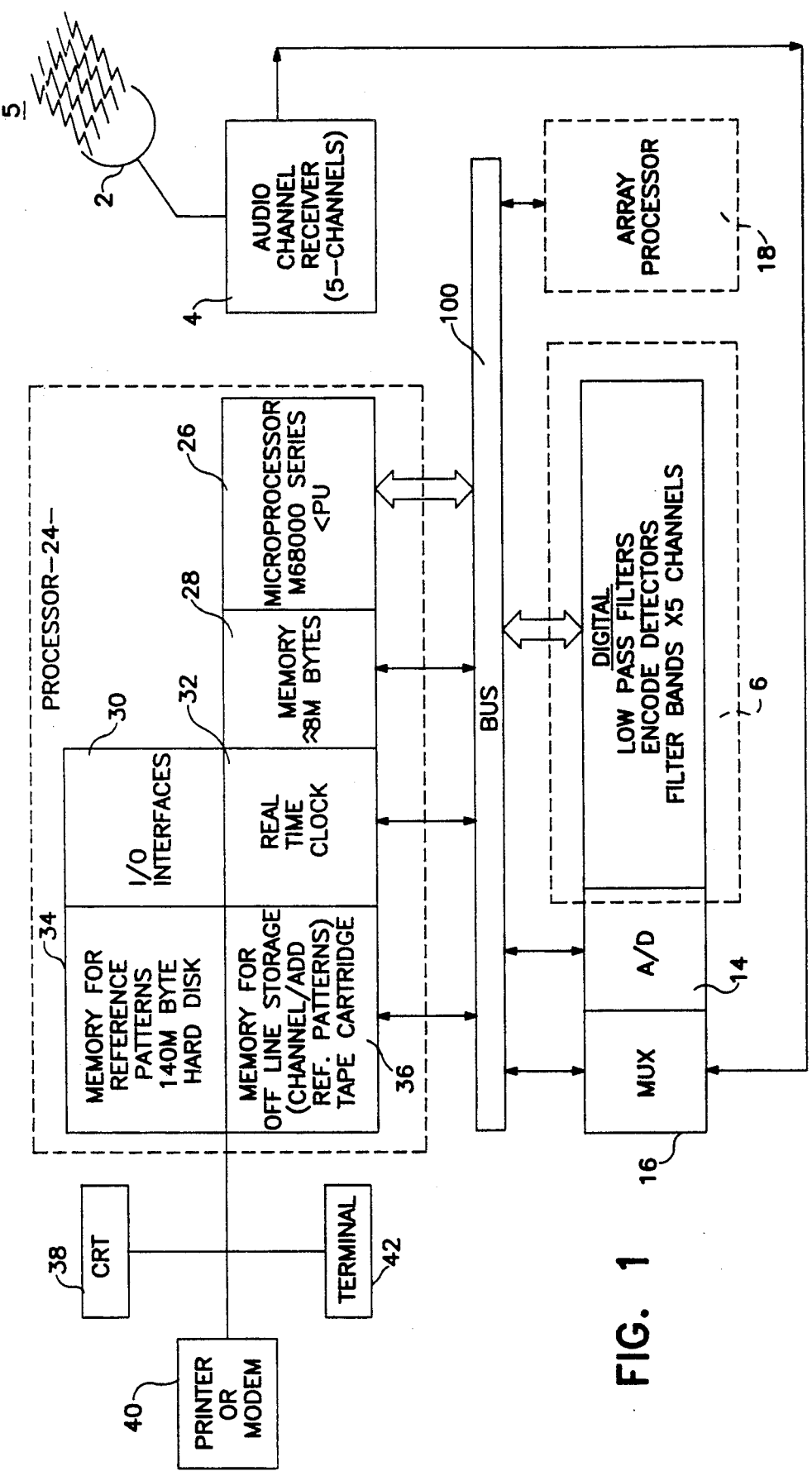
FIG. 1 is a block diagram depicting the system according to the presently preferred embodiment.

While the present invention will be described wit the respect to an improvement in the system described in the '562 patent, persons having ordinary skill in this field will recognize that the teachings of this invention may be utilized in a wide variety of signal recognition environments. For example, the present invention will find application in voice processing systems, speech recognition systems, acoustical communications systems, etc. Therefore, the appended claims are to be interpreted as covering all such equivalent signal recognition systems.

First, an overview of the invention will be provided for clarification purposes. The '562 patent describes apparatus and method wherein broadcast information is recognized using a two-step classification process. In the first step, the input signal is compared to a first stage library and a coarse spectral analysis is performed. The first stage comparison generates a queue of signal identifications from the first stage reference library according to the coarse spectral analysis. Then, a second, finer correlation is performed in the second stage in the queueing order established in the first stage. The present invention proposes an improvement in the first stage classification process in order to reduce the recognition time and the number of entries in the first-stage queue.

In fact, the present invention has demonstrated such high efficiency that it may be useful without the second stage for certain signal recognition systems.

The first stage analysis screens the input signal and eliminates a large number of candidate signals from consideration in the computationally demanding time-warped correlation carried out in the second stage. If the first stage efficiency can be increased from 80% to 90%, the system capacity is doubled. A prototype of the present invention has demonstrated over 98% efficiency in rejecting false alarms. Thus, a factor of 10 improvement in the system according to the '562 patent can be achieved.

In the '531 patent, an efficient signal recognition system was disclosed that maintained a sufficient time-bandwidth product to allow accurate discrimination of signal signatures while providing a means for making the system insensitive to broadcast speed variations and transmission aberrations. This technique, known as segmented correlation, and the other implementation details described in the '531 patent provided a highly successful system capable of recognizing any of 25 songs on a single channel with high reliability. The present invention has as a goal the ability to identify any of six thousand recorded signals on each of five simultaneous broadcast channels with similar reliability. Additional system tuning and prototype modeling should increase the capacity to nearly ten thousand songs per channel.

Central to the concepts embodied in the '562 invention is a technique for compensating for broadcast speed variations known as linear time warped correlation. This technique is more robust than the previous segmented correlation approach in that it maintains a stronger relationship between portions of the feature vector that were derived from different portions of the recording. In addition, a hierarchical recognition procedure serves to multiply the available processing capacity by screening the candidate recognitions using a coarse sorting algorithm. This technique consumes less computing resources to scan the entire signal data base, excluding candidates that clearly will not pass the second-stage recognition criteria. Those that are acceptable by the first stage process (typically 10 to 20%) are analyzed by the computationally intensive linear time warped correlation procedure of the second stage in the order of probability of recognition (queue) established in the first stage. Besides greatly increasing the system capacity, the '562 invention reduced the reference pattern duration from the previous 64 seconds to 28 seconds to allow for the identification of shorter duration signals, such as commercials.

The technical approach leading to the presently proposed system will now be described. Given the system objectives noted above, two problems presented themselves. First, more distinct feature vectors must be provided for the first stage analysis, and second, the new architecture must be compatible with the architecture described in the '562 patent. That is, the first stage classification process must accept the same set of four envelope detected frequency bands used in the '562 patent. The output of the first stage classifier must be a list of pattern numbers to be evaluated in the second-stage correlator.

To be effective, the first-stage algorithms are required to be tolerant of speed variations and other aberrations while providing high discrimination between patterns. The false alarm rate must be minimized without causing missed detections. In fact, the first stage classifier must be biased so that only signatures that are clearly incorrect will be rejected. This usually results in an increase in the false alarm rate. It is difficult to simultaneously optimize both of these performance parameters.

Figure 9:
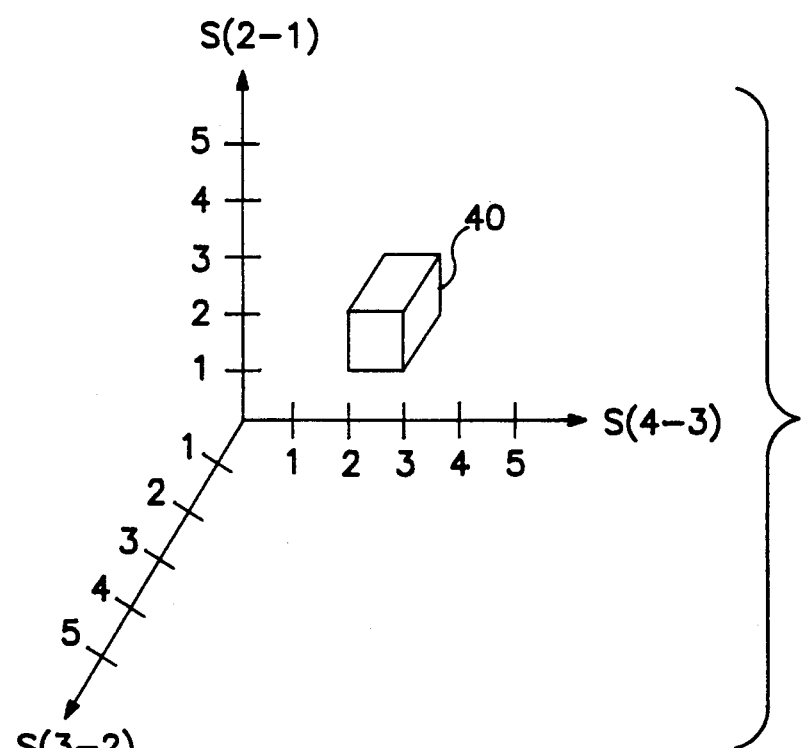
FIG. 9 is a depletion of the quantized feature vector plotted in three-dimensional space.

A feature vector may be used to define a feature space having a number of dimensions equal to the number of features in the vector. Such a feature space may be denoted "hyperspace". The feature vectors of each target signal are stored in hyperspace according to their calculated values. In recognition, the feature vector derived from the received signal is used to search hyperspace to discover the signal or signals whose signatures are stored in a particular area of hyperspace. Hyperspace may contain a plurality of "clusters" in which the feature vectors of a plurality of signals may be stored. For example, similar signals may produce similar feature vectors which would be stored in close proximity to each other in hyperspace. If the spacing between such signal clusters in hyperspace is large relative to the size of the clusters, it may be possible to provide a region of uncertainty around each feature vector in hyperspace that has a minimum overlap of other regions therein. One method of accomplishing this increased spacing is to increase the dimensionality of the feature hyperspace. The value of each feature is treated as a coordinate in hyperspace. For example, as depicted in FIG. 9, if three features are used, they form a feature vector that specifies a position in three dimensional space. If the feature vector is then quantized (assigned to a particular category based o the detected feature value), each component can take on one of a number of discrete values, e.g. 5. Then, the space will contain 125 discrete locations. If a signal identification code is assigned to each location, then it is possible to extract and quantize the same features from a received signal, the feature vector can be mapped to the same location in the three dimensional space and the appropriate signal identifier can be retrieved. This would allow unique access for 125 signals if their feature vector values are unique after quantization. Unfortunately, the features that are measured are not unique. Several different signals could generate the same feature vector. This may be handled by assigning a list of possibilities to each location in hyperspace. FIG. 9 shows an example of a three-dimensional hyperspace wherein each of the three features can take on 5 values. A "cluster" 40 is depicted therein centered on the location $(S(4-3)=3; S(2-1)=2; S(3-2)=0)$.

A second problem is that a signal o pattern to be recognized may not generate the appropriate vector due to time compression or other transmission aberrations. Thus, the variability of the features must be studied, and it must be determined how the resultant feature vectors will designate different regions in hyperspace. The search for distinct features is based on the criteria that they are stable under the influence of expected aberrations and that they are distinctive. If one can assume that the individual features that compose the feature vector are independent, then by increasing the number of features, the separation between clusters in hyperspace can be dramatically increased without increasing the cluster size. To allow for variations in the quantized features, and to reduce the requirement for time alignment, multiple feature vectors can be generated at different time displacements, allowing each signal to sweep out a region of the hyperspace that it will occupy. The search for such distinctive time invariant feature vectors will be described below.

One of the most important aspects of any pattern recognition problem is the identification, creation, and selection of features that are stable when a particular signature is present, but provide different indications if the signature is not present. In developing this invention, audio signals from records, tapes, and airplay were digitized at a rate of 2500 samples per second after being low-pass filtered at a cut-off frequency of 1.0 kHz. The frequencies below 1 kilohertz have been shown to be relatively unaffected by spectral modifications employed by broadcasters. Approximately 65 seconds of audio from these signals was digitized from 72 songs and stored as an experimental data base. Each of these data files was then processed by a software simulation of the front end processor that forms the envelopes of four frequency bands. The output from the simulator was a set of multiplexed floating point files which could be plotted on a graphics terminal or processed by a program to determine characteristics of the data that could be exploited to form good features for the feature vectors. A spectral analysis program computed the power spectrum, log power spectrum, cepstrum, and auto-correlation functions of each frequency band. The power spectrum and log power spectrum are frequency domain functions, while the cepstrum and auto-correlation functions are time domain functions. Next, a statistics program was used to compute statistical moments of the signal values of the four bands of the received signal. Such statistical moments include the mean, variance, skew, and kurtosis. In addition, the co-variance matrix of the four bands was computed.

In examining the power spectra and the log power spectra, it was discovered that while different songs had spectral peaks at different frequencies, it was not clear how to select a small number of spectral components that would reliably discriminate among the different songs. This applies to both the linear and log power spectra. However, computing the signal bandwidth of each band provides a set of four numbers that should be stable with regard to speed variations. These features were evaluated utilizing eight different time delays In examining the auto-correlation functions, it was discovered that the only stable features that could b derived were closely related to the bandwidth measurements discussed earlier. This is to be expected since the power spectrum and the auto-correlation function are a Fourier transform pair. Features derived from the auto-correlation function were therefore considered to be redundant and were discarded in favor of those derived from the power spectrum. The cepstrum was examined and found to have no stable useful features. This is because the cepstrum exploits the presence of harmonically related signal structures to determine the period of the composite waveform. These harmonic structures were not found to be present in the envelopes of the bandpass filtered audio.

In studying the behavior of the features produced by the statistics program, it was discovered that skew and kurtosis values were distinctive between songs, and were relatively stable when computed at time offsets within the song. There are two other characteristics of these features that were found to be attractive. First, both skew and kurtosis are self-normalizing. That is, their value is independent of loudness. Second, their values are virtually unaffected by speed variations in the recording. This is because their calculation does not explicitly involve time or frequency. This was considered to be quite important since a significant amount of effort has been directed towards making the entire system immune to speed variations induced by broadcasters. It was discovered that some songs produced significantly different values of skew and kurtosis at different time offsets. This occurred when the time offsets moved the window of analysis into regions of a song where the entire character of the song was different. This is assumed to be a general problem that will affect any set of features chosen, and therefore must be dealt with in the recognition algorithm instead of the selection of features to be used.

In conclusion, the present inventor discovered that the properties of skew and kurtosis are well suited for categorizing broadcast signals efficiently and reliably. Bandwidth estimations also performed well, but were less immune to the effects of time offsets. Since the recognition algorithm deals directly with this, envelope bandwidth may still prove to be a useful discriminating feature. It should be pointed out that each of the features discussed was computed for all four frequencies bands. Therefore, a total of 12 features were considered to be qualified in terms of their discrimination capabilities, four for each of skew, kurtosis, and envelope bandwidth If all 12 features are used, a 12-dimensional feature hyperspace would be produced. This probably would be unacceptable from the point of view of the required memory, and the number of features that must be calculated. Therefore, in terms of the present embodiment, it was decided to use only the skew and kurtosis values, thus producing a total of eight features. However, this still may be unacceptable in view of the required memory. Therefore, the four frequency bands were linearly combined into three waveforms, thus providing skew and kurtosis values for each of three waveforms, producing six dimensional feature hyperspace. A confirmation of this choice will be discussed in greater detail with respect to the vector quantization procedures discussed below.

Figure 8:
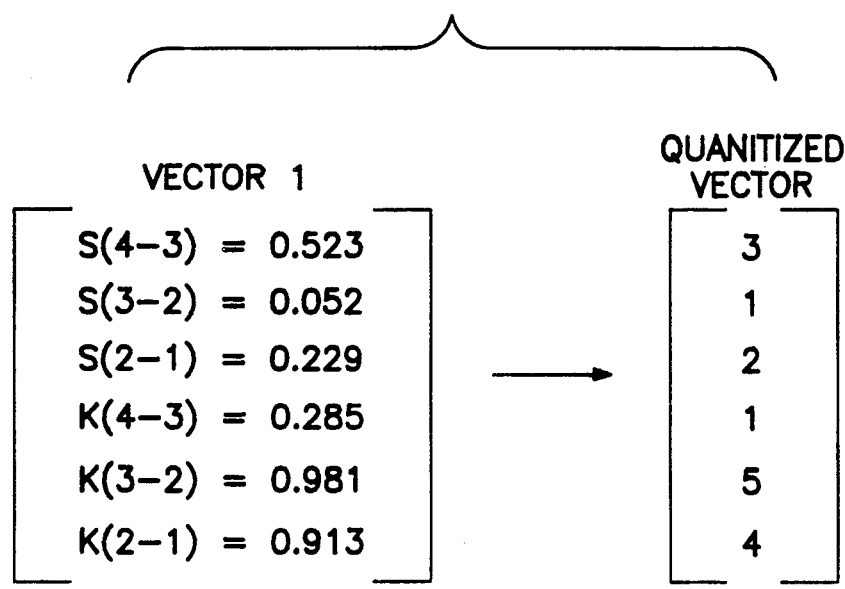
FIG. 8 shows the quantization of a feature vector.

Vector quantization is in principle a simple concept. It involves reducing the resolution of each vector component from its continuous range of values to one of a small number of values, e.g., reducing a plurality of multi-digit values to a plurality of single-digit values (see FIG. 8). For example, the feature value range could simply be partitioned into several bands of equal width. The feature is then encoded or quantized by replacing its multi-digit value with its band number. There are two primary problems with this simple approach First, values that fall close to the boundary between two bands may be erroneously quantized due to noise, distortion, or computation precision limitations. Second, it is not likely that the feature values will be uniformly distributed over the entire range. This would lead to a heavy concentration in certain bands, reducing the information content of the quantized feature. In the limiting case where all values fall into the same band, the feature would contain no information at all. This is dealt with by using non-uniform width of the bands (e.g., FIG. 10), and by employing an overlap quantization process for the encoding of reference feature vectors for the reference library (e.g., FIG. 12).

First, it is necessary to consider the number of quantization levels and the number of features employed in the feature vector. These specify the dimensionality and the density of the feature hyperspace. FIG. 7 lists the number of discrete locations in the hyperspace as a function of the number of features used and the number of levels to which they are quantized. Notice that for all cases where the number of levels is greater than 3, more is achieved by increasing the number of features than by increasing the number of quantization levels. It is worthwhile to employ the largest possible feature hyperspace within the limits of memory. This tends to spread the signals that are represented by the feature vectors over a larger volume with the result that fewer signatures need to be evaluated by the second-stage correlator. In the preferred embodiment, the inventor has selected five quantization levels and six features as a reasonable compromise. This provides a hyperspace that has 15,625 discrete locations.

Two vector quantizations algorithms were developed. The first partitions each vector according to its statistical distribution so that each region contains the same number of entries (e.g., FIGS. 10 and 11). The second performs a similar process but returns two quantized feature vector (e.g., FIGS. 12, 13, and 14). The two vectors represent the most likely region and the nearest neighbor. Histograms were prepared of skew, kurtosis, and bandwidth values using a sample signal library. The histograms for kurtosis will be discussed below with respect to the overlap and non-overlap vector quantization algorithms.

Figure 12:
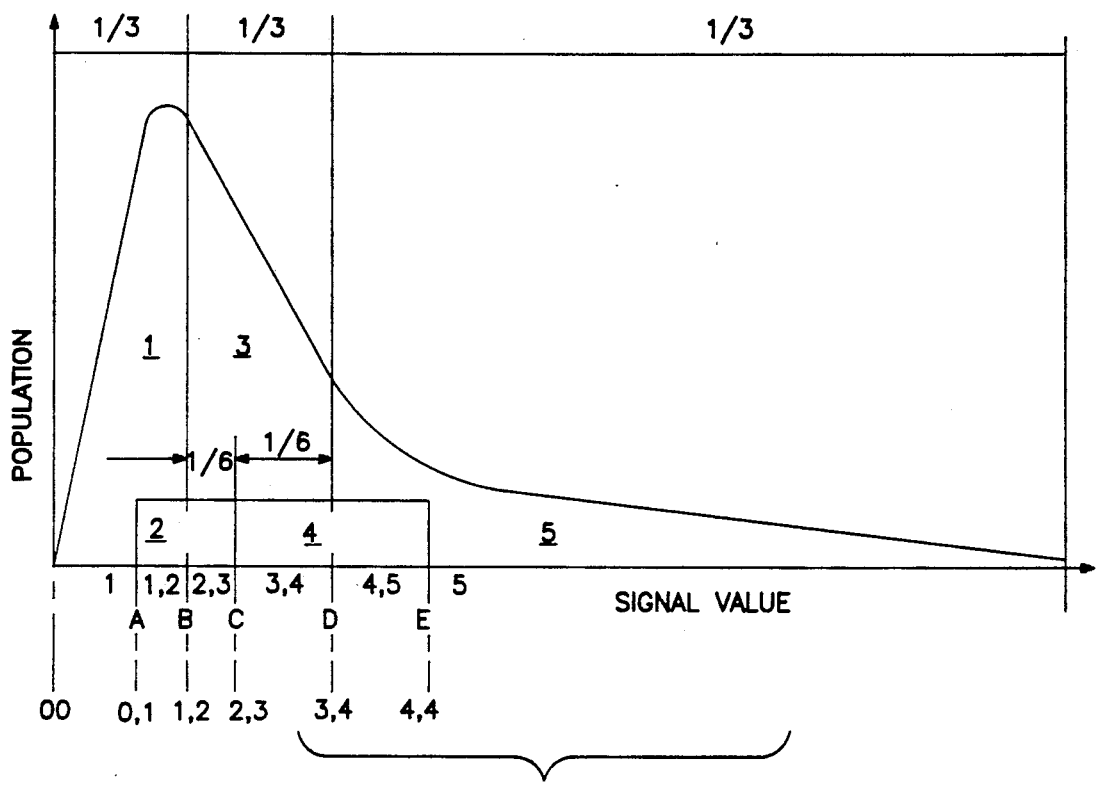
FIG. 12 depicts the population density of kurtosis values used in non-uniform overlap encoded vector quantization.
Figure 13:
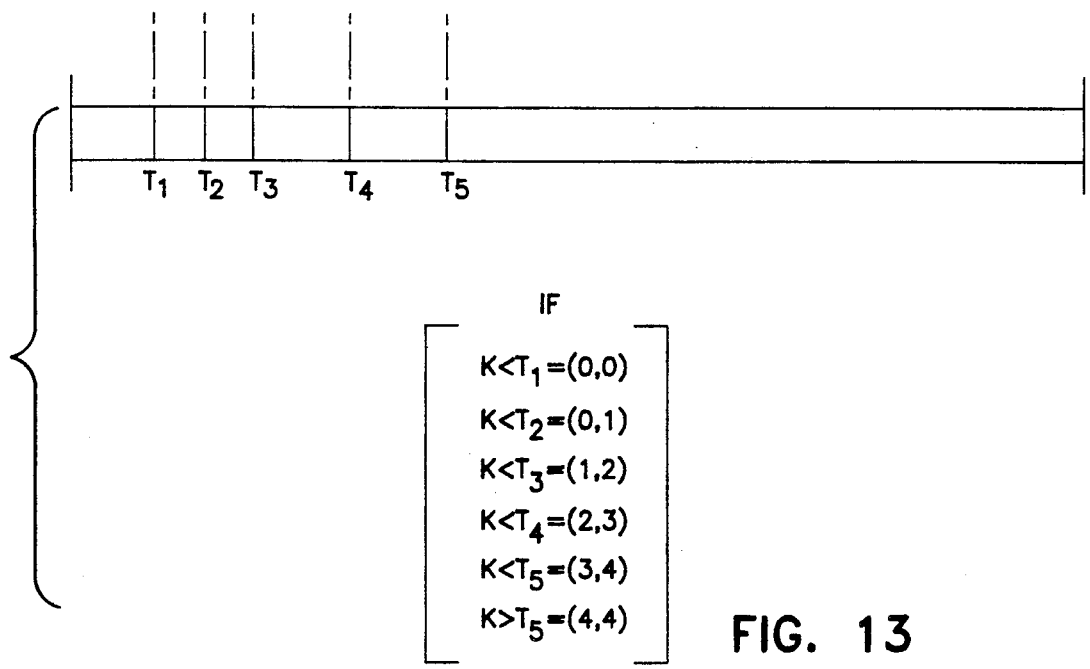
FIG. 13 shows how feature vector quantities are assigned quantized values in the population of FIG. 12.
Figure 14:
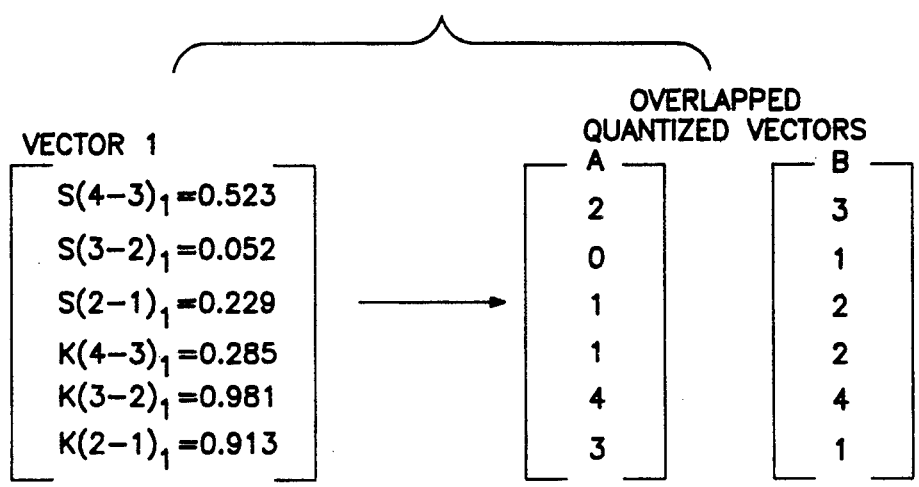
FIG. 14 shows how the feature vector is quantized in the overlap-encoded vector quantization scheme.

FIG. 12 illustrates the overlap encoded vector quantization of a kurtosis feature. Note that the kurtosis value population is first partitioned so that each region contains one-third of the total number of samples. Thresholds B and D are used to separate regions 1, 3, and 5. Two additional regions are constructed that also each contain one-third of the points. These are centered o thresholds B and D with one-sixth of the total points above and below Regions 2 and 4 are bounded by thresholds A, C, and E. As indicated by FIG. 13, feature values that are less than threshold A are clearly in region 1 and are encoded as (0,0). Feature values that fall between thresholds A and B may belong in region 1 or 2 and are encoded as (0,1). Those that fall between thresholds B and C may belong in region 2 or 3 and are encoded as (1,2). Values between C and D fall in regions 3 or 4 and are encoded as (2,3). Values between D and E may belong to region 4 or 5 and are encoded as (3,4). Finally, if a value is greater than threshold E, it is clearly in region 5 and is encoded as (4,4). Since each vector utilizes 6 features, the output of the overlap vector quantization process produces a pair of six element vectors as depicted in FIG. 14. By permuting the elements of these two vectors, up to 64 new vectors can be formed that specify locations in hyperspace where the signal may be stored. However, each time a (0,0) or a (4,4) code is produced, duplicate vectors are generated. With the sample library used in preliminary investigations, it has been observed that an average of 21.4 distinct vectors are generated by permuting elements of overlapped quantized vectors A and B. These distinct vectors are termed the memory "neighborhood" of a song in hyperspace.

Figure 10:
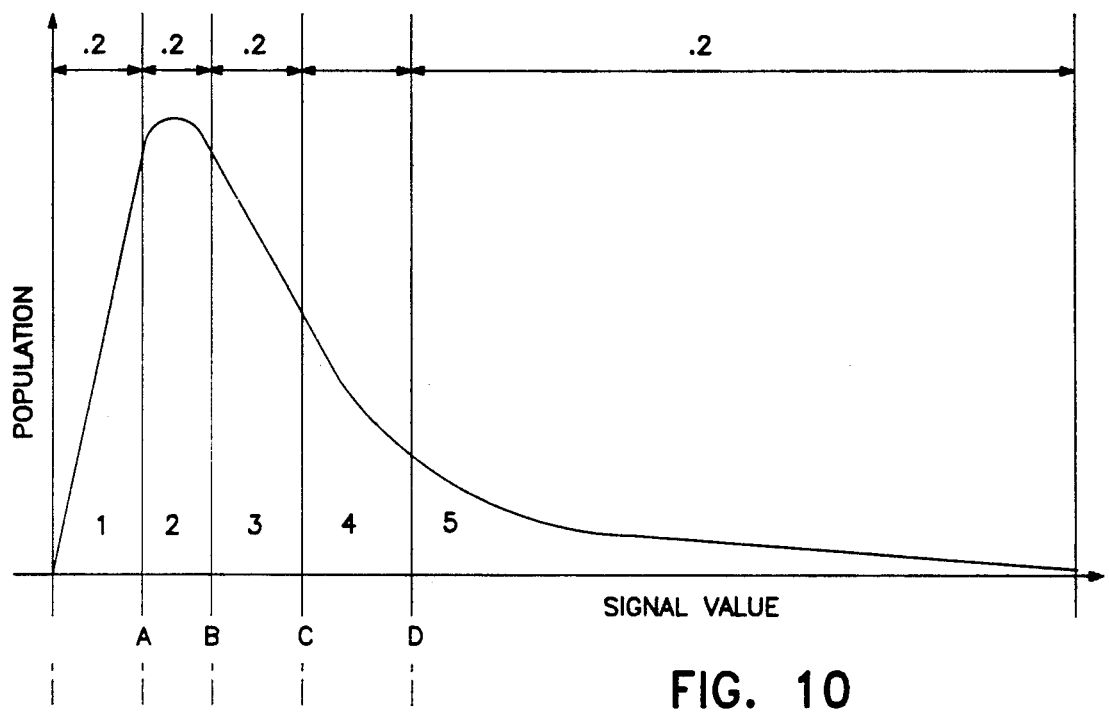
FIG. 10 depicts the population density of kurtosis values used in non-uniform vector quantization without overlap.
Figure 11:
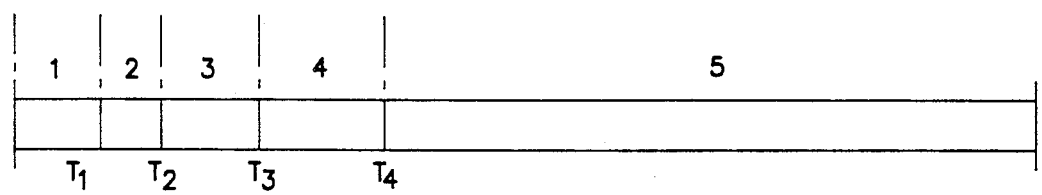
FIG. 11 depicts how the feature vector quantities are assigned quantized values in the population of FIG. 10.
Figure 11:
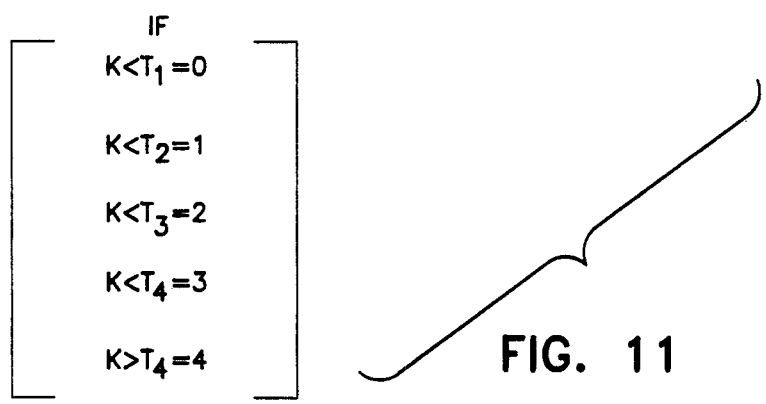

An alternative to the overlapped quantization algorithm is the non-overlapped quantization algorithm depicted in FIGS. 10 and 11. FIGS. 10 and 11 depict a histogram of kurtosis values generated from the sample library. According to the non-overlap vector quantization algorithm, quantization thresholds are derived by sorting all of the feature values in ascending order and then partitioning this list into five equal sized regions The data values located at the boundaries are selected as the thresholds. This ensures that each region will contain the same number of samples and the resulting hyperspace will be filled uniformly. Feature vector values falling within any of the regions 1, 2, 3, 4, or 5 are simply encoded with the value, as shown in FIG. 11. This process is workable in generating the hyperspace in memory, although the overlap quantized vector algorithm is preferred. However, the non-overlap quantization algorithm will be used during the process of recognizing the received signal discussed below.

The final process to be discussed with respect to the technical approach is how the quantized vectors are then used to either write into or extract information from a data base containing signal identifications. The present inventor has investigated two approaches to storing and retrieving information that could be applied to the recognition of signal patterns. The first involves storing all of the variations of the expected pattern in hyperspace. This is simply a matter of assigning the song identification code to each location described by the permutation of the two vectors returned by the overlapped vector quantization process. Access involves the computation of a single location that contains a list of patterns that meet the search criteria. This is the most efficient from the point of view of real-time recognition, but requires the storage of the identification code at many locations in the feature hyperspace. An alternate approach is to store each pattern only once in space. When the space is accessed to find a list of candidate songs, all of the variations that are observed in the overlapped quantization process must be searched. The lists that are found at each location must then be merged. While this second approach conserves memory, it slows down the recognition process. A "belt and suspenders" process is also possible that stores all expected variations of the features, and then searches the region for distortions. While this method is probably the most robust, it pays both the time and memory penalties. The first method was selected for further pursuit since real-time performance is important and it is not felt that the limits of memory are being stretched.

Figure 15:
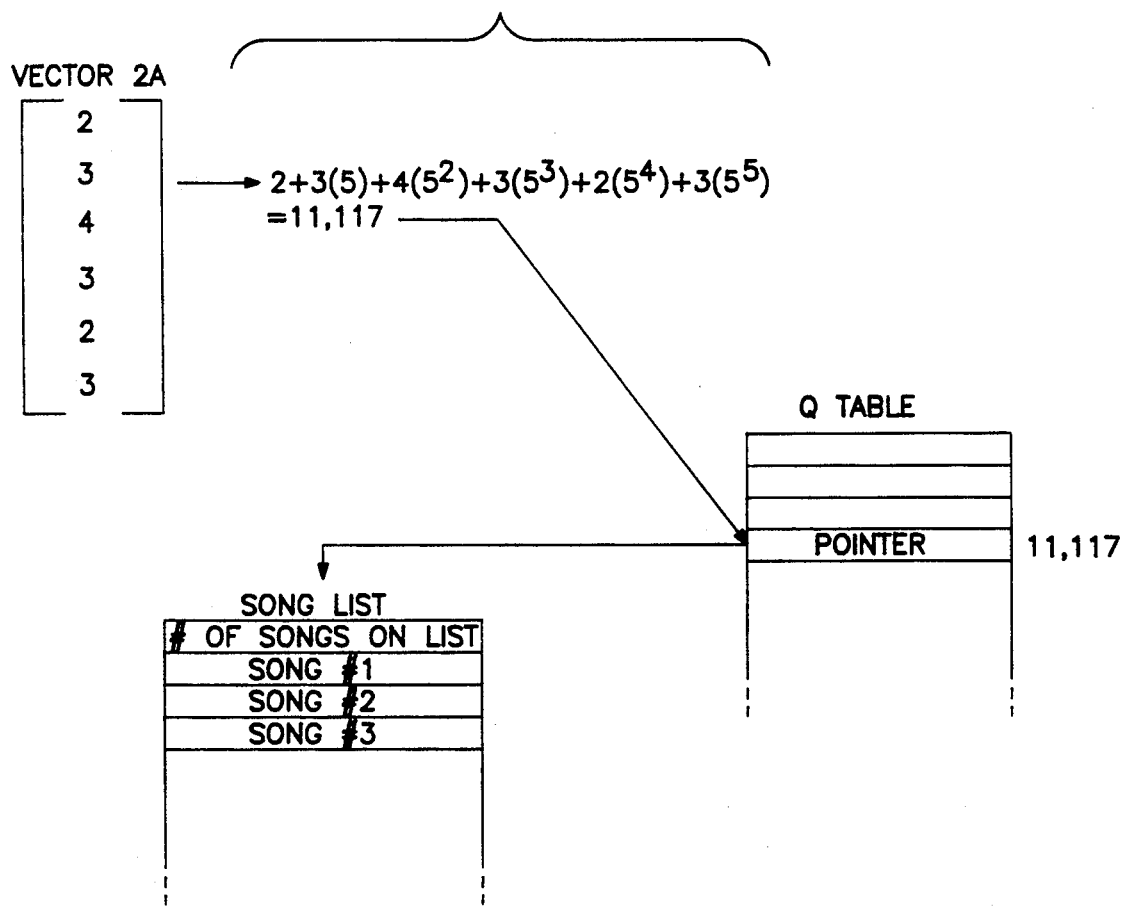
FIG. 15 depicts how the quantized vector is converted into a weighted sum which is used to address a data base to identify a signal.

There are many methods for mapping the signal identifications into memory, and then retrieving the identifications in accordance with a received signal. The presently preferred embodiment utilizes one possible approach, although the invention is to be construed as covering all obvious equivalents. According to the parameters described above, there are 15,625 discrete locations in the vector hyperspace. Therefore, a table of pointers has been constructed which point to lists containing identification codes of potential pattern matches. Each list has a variable length that is updated when signals are added or removed. FIG. 15 illustrates this access method. When a signal is to be added to the data base, all permutations of the two vectors derived from the overlapped quantization process are computed A position on the list is then computed as a weighted sum of the vector components using a non-decimal radix, e.g. 5. Each position in this table may point to an empty list or to the location of a list containing the identification codes of signals that map to this location in hyperspace. These lists are dynamically generated and modified. The first entry in the signal list indicates the number of identification codes that follow. The rest of the list contains the identification codes. Adding a signal identification to the list involves testing to see if the list exists. If not, it must be created. The signal identification is then added, and the list size is set to one. If the list already exists, a check is made to see if the signal identification is already on the list. If it is already on the list, the table is simply exited. If not, the list is expanded by 1, and a new identification code is appended. The first entry in the signal list is also updated to indicate that an additional signal identification code has been added. Removing a signal identification code is a similar process.

The performance of this approach is dependent on the stability of the statistical features chosen. Moment were selected since they are unaffected by speed variations. However, if time offsets are involved, it is quite possible that segments of the song will exhibit different properties that will place it in a different region of the hyperspace. This will result in missed detections. This was investigated by evaluating the feature stability at several time delays and most were found to be stable. However, some changed significantly with time delay. To counter this, statistics are computed over a set of fourteen second intervals within the 28 seconds used by the correlator. At each offset, a set of overlapped locations in the hyperspace is computed, and the song ID code is added to the corresponding lists. If the song is stable, no new entries are generated. However, if the statistics change with time delay, the song is added to all regions in which it might be found to exist.

This concludes a discussion of the technical approach and the overview of the present invention.

Figure 16:
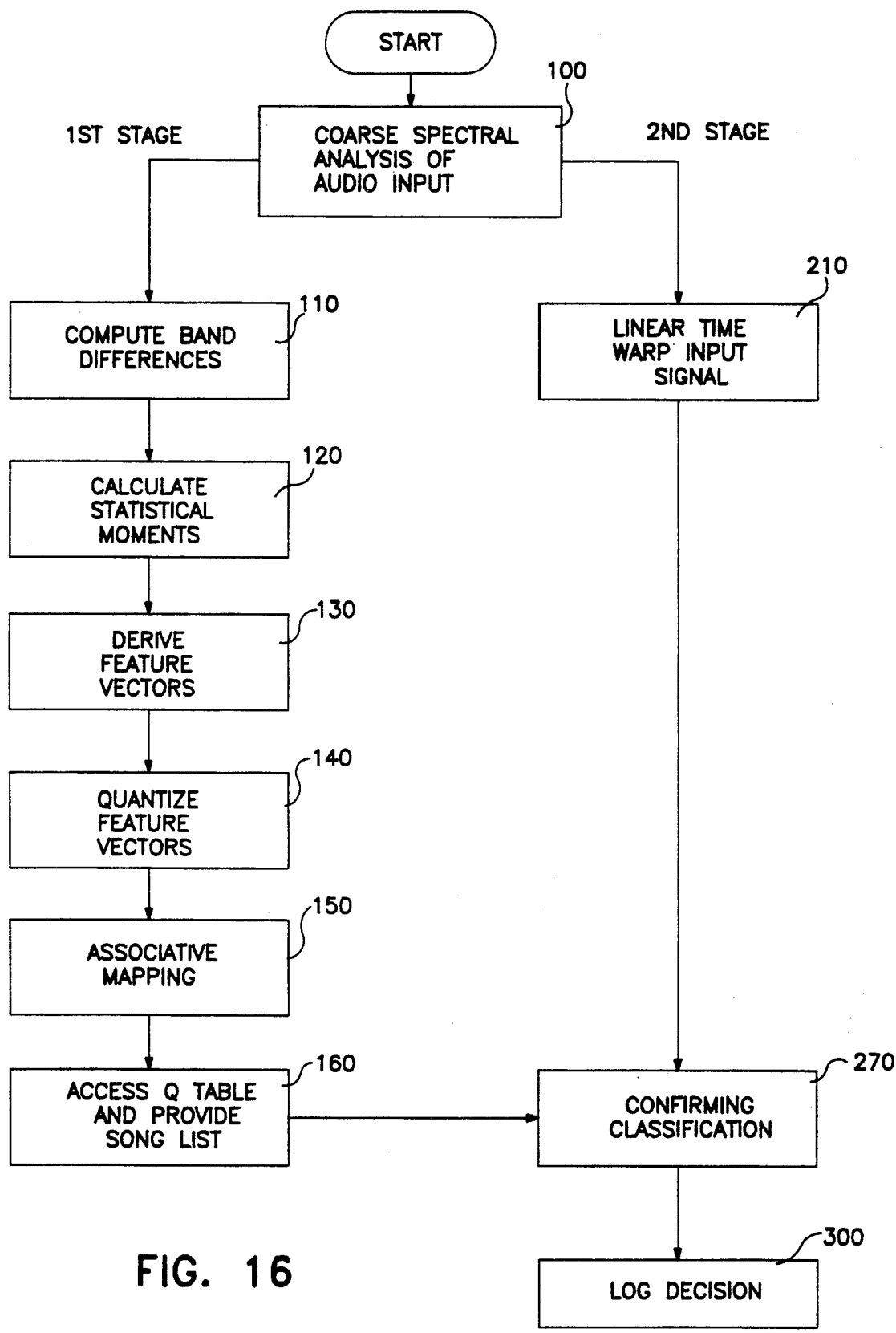
FIG. 16 is a top-level flow chart depicting a method according to the preferred embodiment.

FIG. 1 depicts a block diagram of the apparatus according to the present invention, and FIG. 16 depicts a top-level flow chart for the process according to the present invention. In the present invention, the processing structure of FIG. 1 allows simultaneous processing of up to five audio channels. Therefore, up to five broadcast stations may be monitored and their broadcast programs classified. Additional hardware and software modifications could be performed to increase or decrease the number of channels simultaneously monitored.

Figure 2:
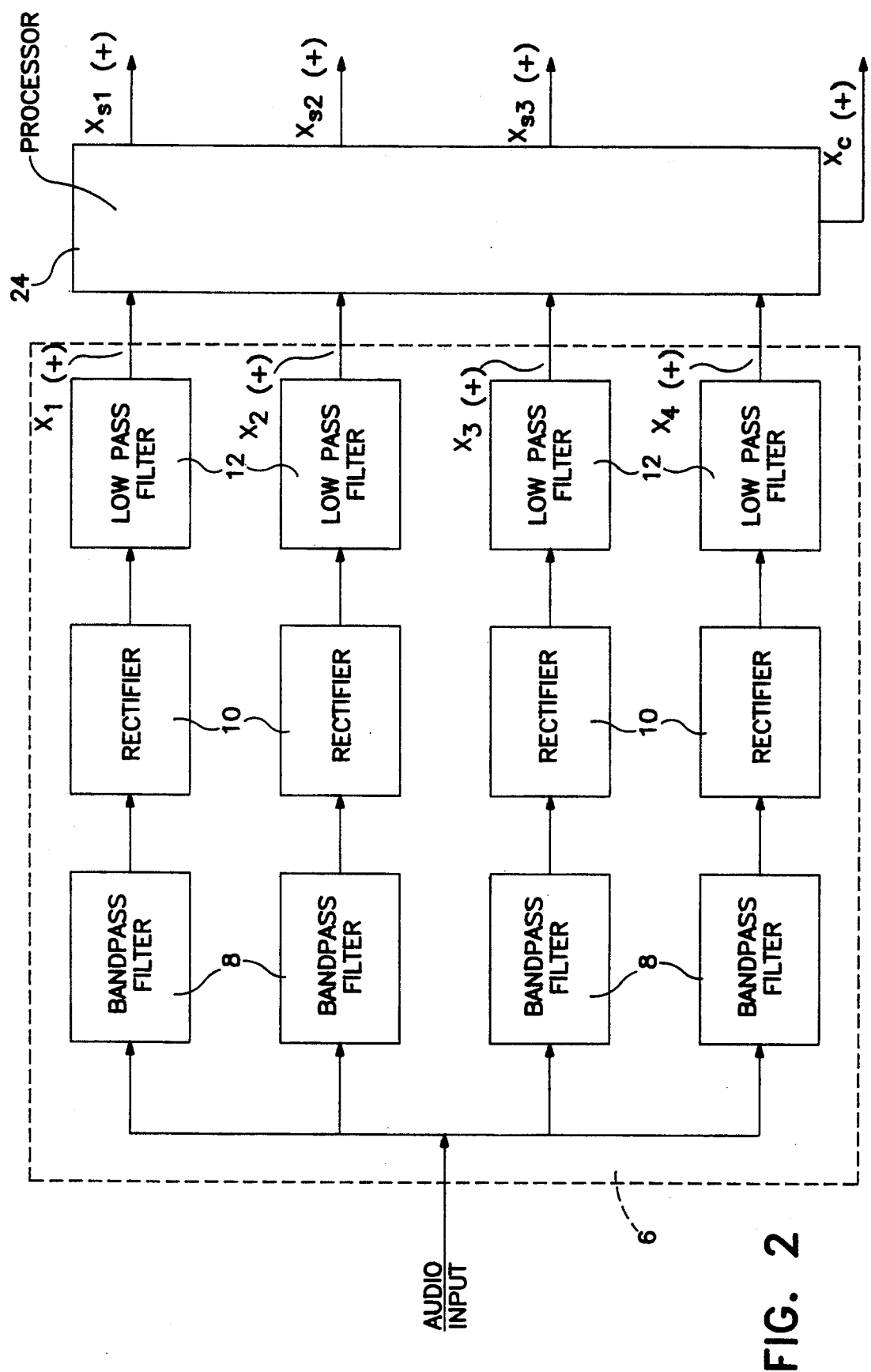
FIG. 2 is a block diagram showing the principle of filtering the received signal into four different frequency bands.

Antenna 2 receives radio waves bearing audio signals. The antenna apparatus is capable of receiving up to five radio channels simultaneously. The audio signal is received by audio channel receiver 4, and provided to audio preprocessor 6. Audio preprocessor 6 includes filter banks 8, envelope detectors 10, and low pass filters 12, as depicted in FIG. 2. Alternatively, the audio preprocessor 6 may be incorporated digitally into the processor 24.

FIG. 1 also depicts analog-to-digital converter 14 which may be used to digitize the audio signal. Multiplexor 16 is used to carry out the multiplexing operations when a plurality of audio channels are being simultaneously monitored. Both A/D converter 14 and multiplexor 16 are coupled to bus 100. Also coupled to bus 100 is an array processor 18. Feature vector operations are carried out in array processor 18 and include the time warping of the second stage feature sequence and the second stage correlation computations.

Processor 24 is also coupled to buss 100 and performs the functions of control, data base management, and all in/out (I/O) management in the first stag classification calculations. Processor 24 may include a microprocessor 26, a memory 28, I/O interfaces 30, a real-time clock 32, reference pattern memory 34, and an off-line memory 36. Preferably, microprocessor 26 may be a Motorola 68020 series microprocessor. Preferably, working memory 28 includes at least 8 Megabytes of memory. Likewise, pattern memory 34 stores both the first stage and second stage reference libraries and preferably is realized by at least a 140 Megabyte hard disk. The off-line memory 36 may be used to change/add/delete reference patterns from the reference pattern libraries in memory 34. Preferably, off-line memory 36 comprises a tape cartridge.

Finally, the processing system may be coupled with such peripherals as a CRT 38, a printer or modem 40, and terminal 42. Such peripherals are coupled to the system through I/O interfaces 30.

Turning now to FIG. 2, a coarse spectral analysis will be described. The received audio signal is provided to audio preprocessor 6 where it is divided into a plurality of channels. In the presently preferred embodiment, four channels have been selected. However, greater or fewer channels may be used depending upon the exact type of signal which is to be classified. Each channel includes a bandpass filter 8, each filter having a different value. Each channel also includes a rectifier 10 and a low-pass filter 12. The purpose of the audio preprocessor is to reduce the amount of information processed in the first stage. This provides a long term averaging of the first stage features. Since the purpose of the first stage is to reduce the computations required for recognition, it is desirable to reduce the amount of information processed per unit time. Signal discrimination accuracy is proportional to the time bandwidth product of the feature vector. Therefore, by reducing the feature vector bandwidth while expanding duration, accuracy is maintained while required processing per unit time is decreased. This is true for any process that requires continuous searching for time series events.

Figure 3:
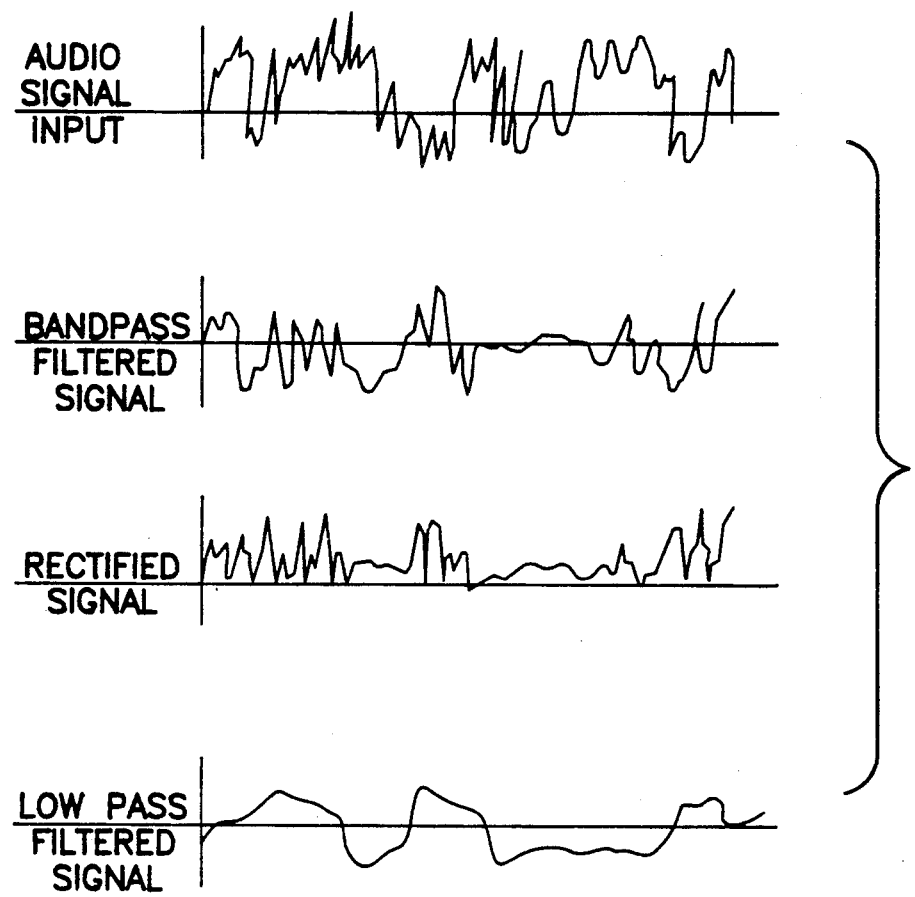
FIG. 3 depicts a series of waveforms showing the wave-shaping carried out in the processor of FIG. 1.
Figure 4:
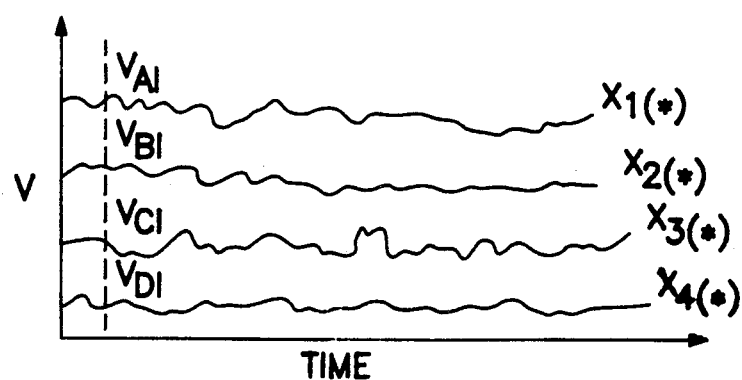
FIG. 4 is a series of waveforms showing four feature sequences generated by the processor.

In order to accomplish this, the audio input signal depicted in FIG. 3 is provided to each of bandpass filters 8. Each bandpass filter outputs a filtered signal, for example, the one depicted in FIG. 3. The filtered signals are provided to the rectifiers 10, each of which outputs a waveform shown in FIG. 3. Finally, the rectified signals are provided to lowpass filters 12, each of which outputs a lowpass filtered signal, as depicted in FIG. 3. By sampling the reduced bandwidth signal, processing time is conserved while simultaneously reducing the sensitivity of the system to speed variations in the audio signal. Therefore, from lowpass filters 12 are provided a plurality of waveforms as depicted in FIG. 4. These waveforms are respectively denoted by $X_1(t)$, $X_2(t)$, $X_3(t)$, and $X_4(t)$. Each of these waveforms is provided to processor 24 which generates the feature sequences according to the waveforms.

Processor 24 thus provides a plurality of feature sequences denoted by $X_{S1}(t)$, $X_{S2}(t)$, $X_{S3}(t)$, and $X_C(t)$ (FIG. 2). Each of these feature sequences is formed as a linear combination of the waveforms $X_1(t)$ through $X_4(t)$. In the present invention, the linear combination is nothing more than a difference between two bands. For example, signal $X_{S1}(t)$ is the linear combination of $X_4(t) - X_3(t)$ (hereinafter denoted "band (4-3)"). Likewise, signals for band (3-2) and band (2-1) are produced in processor 24. This step is depicted in FIG. 16 at step S110.

However, in some implementations it will be desirable to form sequences that are linear combinations of the four input waveforms and have certain specific characteristics such as orthogonality. Additional preprocessing may be applied at this point to compensate for distortion induced by the broadcaster. An example of such distortion is the compression of dynamic range or expanding it using a logarithmic compression function. Such distortions could b compensated by simulating the dynamic range distortion when creating the data base and/or compensating the received signal for the dynamic range distortion.

Figure 5:
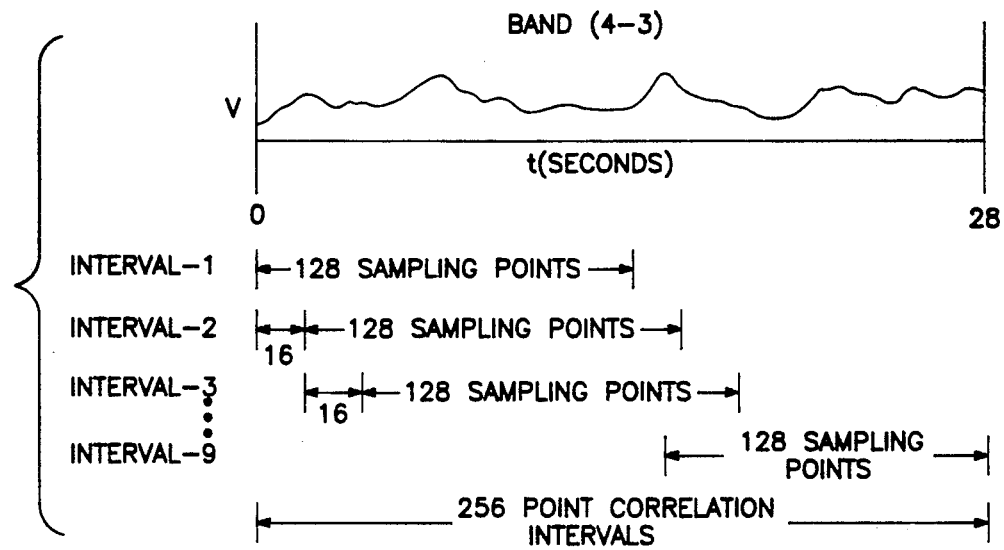
FIG. 5 is a chart showing the overlapping sampling of a spectrally distinct portion of the signal for creating the reference libraries.

The next step is to calculate the statistical moments of each of the band difference signals, as denoted at step S120 of FIG. 16. Each band difference signal must be sampled at a plurality of points to generate signal values used to calculate these statistical moments. FIG. 5 depicts the sampling of band (4-3). The sampling process is slightly different for generating the reference library, and for recognizing the received signal. When the reference library is generated, the signal is played into the apparatus of FIG. 1 at audio channel receiver 4. The second stage correlation process depicted at steps S210 and S270 in FIG. 16 is used to choose the most spectrally distinct portion of the signal for use in the reference libraries. Specifically, the processor identifies the most spectrally distinct 28 seconds of the signal for us in generating the first and second stage reference libraries. On the other hand, when a broadcast signal is monitored by the FIG. 1 structure, the signal is broken down into a succession of fourteen second segments, and each segment is analyzed and compared with the reference signal libraries.

Figure 17:
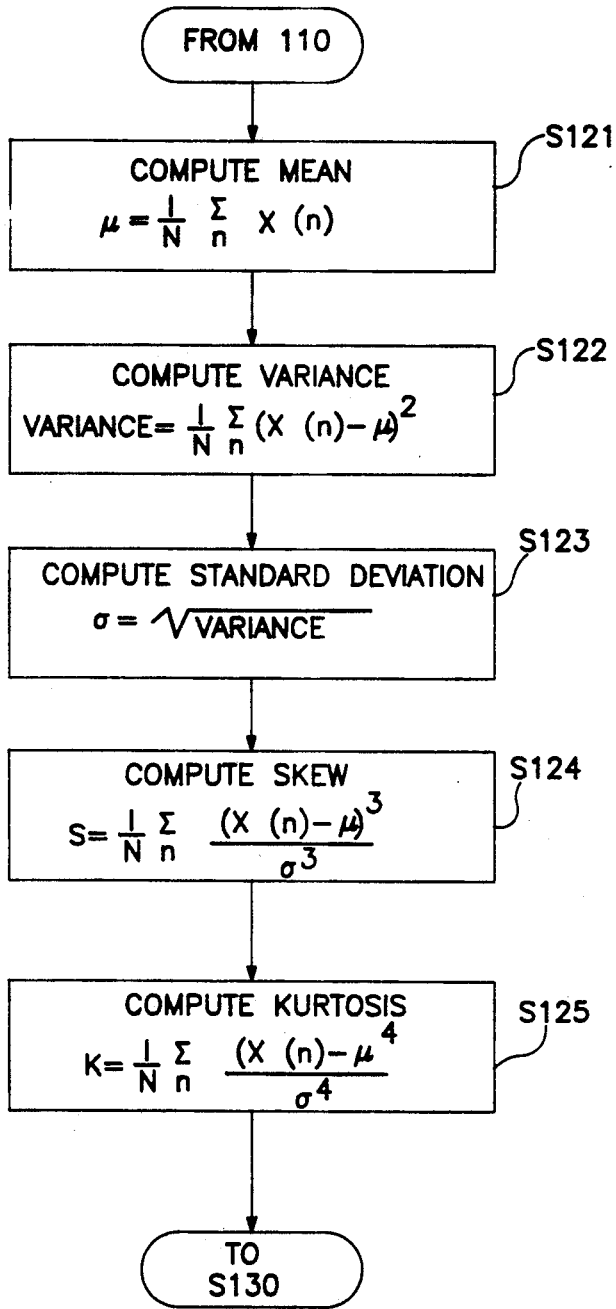
FIG. 17 is a flow chart depicting how the statistical moments are calculated.

According to FIG. 5, the reference library entry for the target signal is determined by repeatedly sampling each band difference signal with a 128 sampling point window through nine intervals, shifting the window by 16 points for each interval. The signal values determined at the sampling points are then used to calculate the statistical moments skew and kurtosis, as noted at step S120 in FIG. 16. FIG. 17 depicts the process whereby the statistical moments are calculated. First, the mean of the sampled signal values is obtained according to:

$$\mu = (1/N) \sum_n X(n) \tag{1}$$

where N is the number of sampling points, $1 < n < N$, and X is the value of the signal (e.g. voltage) at the sampling point. Then, the variance of the sampled signal is obtained according to:

$$\text{variance} = (1/N) \sum_n (X(n) - \mu)^2 \tag{2}$$

From the variance, the standard deviation is computed as follows:

$$\sigma = \sqrt{\text{variance}} \tag{3}$$

Next, the statistical moment or moments can be calculated according to the formula:

$$M_k = (1/N) \sum \frac{(X_n(n) - \mu)^k}{\sigma^k} \tag{4}$$

While the present invention utilizes two statistical moments, skew and kurtosis, a single statistical moment according to Formula (4) can be calculated, or alternatively one or more higher-order moments may be used. According to the preferred embodiment, the skew is calculated as:

$$s = (1/N) \sum_n \frac{(X(n) - \mu)^3}{\sigma^3} \tag{5}$$

And, kurtosis is computed as follows:

$$K = (1/N) \sum_n \frac{(X(n) - \mu)^4}{\sigma^4} \tag{6}$$

The above-described calculations are carried out in steps S121-S125, as depicted in FIG. 17.

Figure 6:
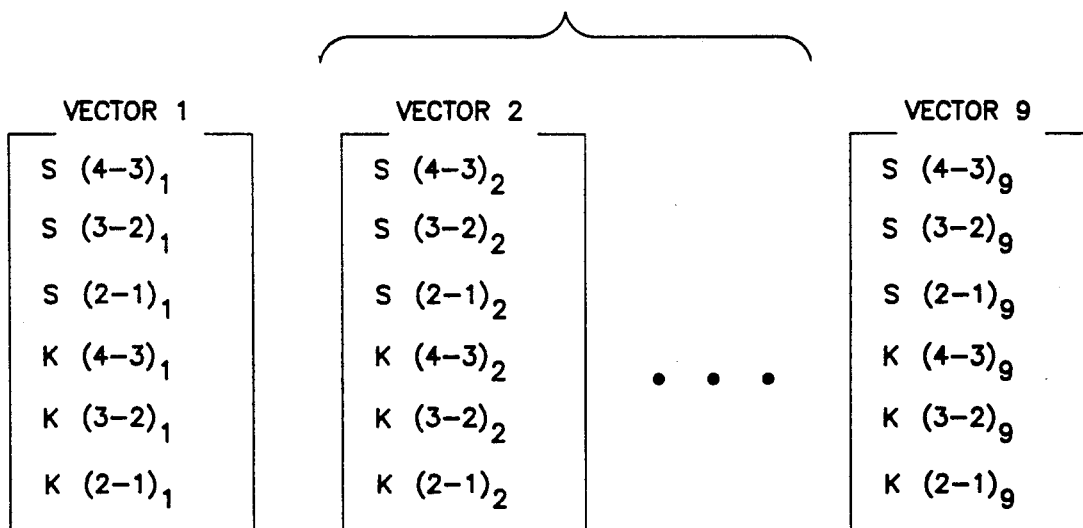
FIG. 6 depicts the feature vectors generated by the sampling performed in FIG. 5.

Once the statistical moments have been calculated, the feature vectors can be derived (step S130 in FIG. 16). As depicted in FIG. 6, a feature vector is derived for each of the nine intervals during the creation of the reference library. Each vector includes skew and kurtosis values for the three band difference signals at each interval. Thus, vector 1 includes values for $S(4-3)_1$, $S(3-2)_1$, $S(2-1)_1$, $K(4-3)_1$, $K(3-2)_1$, and $K(2-1)_1$. These values are actual signal values and are represented by floating point numbers.

Now, nine feature vectors have been generated for each signal, and each feature vector describes a location in hyperspace. A song identification code will then be placed in each neighborhood in hyperspace, the neighborhood eliminating duplicate values The next step is to quantize the feature vectors, as discussed earlier (step S140 in FIG. 16). During the process of creating the reference libraries, the overlapped vector quantization algorithm according to FIGS. 12-14 is preferably utilized. For example, as depicted in FIG. 14, the values of vector 1 are plotted on the graph of FIG. 12, and two overlapped quantized vectors A and B are produced. These quantized vector components are represented by a single digit having a value of 0-4. However, in an alternative embodiment, the quantized vectors may be multi-digit, and may comprise more or less than five distinct values.

After the two quantized vectors A and B are obtained, a permutation of these vectors is performed in order to produce all possible variations thereof. Thus, there are 64 possible locations in hyperspace where the signal values from vector 1 could be stored. Since this permutation is performed for each of the nine feature vectors produced, a total of 576 vectors may have to be mapped in hyperspace for each signal. However, according to the experiments conducted by the inventor, about 21 actual locations in hyperspace are produced for each vector.

Mapping each permuted quantized vector into hyperspace is a simple matter of entering a song identification in a particular location in memory (step S150 in FIG. 16). This is performed according to a process depicted in FIG. 15, although a wide number of mapping algorithms could be used.

In FIG. 15, a weighted sum of the permuted, quantized vector 2A is produced using a non-decimal radix of 5. That is, the vector values are multiplied by different powers of the base 5. Of course, a different radix can be used, or an entirely different method of producing an address could be used. In the example depicted in FIG. 15, the weighted sum of the vector components is equal to 11,117. A table entitled Q TABLE is then accessed (step S160 in FIG. 16) with this address and a pointer is provided pointing to a particular song list #1. During the process of creating the data base, the song identification code is now entered on the song list, and the number of songs on the list is incremented by one. This procedure is repeated for each of the permuted quantized vectors produced from the sample signal, and the identification code for the sample is thus written into a plurality of song lists in memory. This completes the creation of the data base with which the signals are recognized.

During signal recognition, the steps described above are generally similar. The broadcast signal is received, bandpass filtered, rectified, lowpass filtered, and linear combinations of the four bands are produced. The sampling step, during recognition, is somewhat different in that the song is continuously sampled at 14 second intervals. Only a single feature vector is created for each interval, utilizing the skew and kurtosis values calculated as per equations (5) and (6).

The single feature vector for each sampled interval is then quantized using the non-overlap quantization algorithm noted above. Thus, each song interval will produce a single quantized vector. A weighted sum of the single quantized vector components is then obtained and the Q TABLE is accessed using the weighted sum. The pointer from the Q TABLE accesses a single song list. The songs on the single song list will be the candidate songs investigated in the second stage classification procedure. Of course, if a single stage classification process is utilized, the song or songs extracted from the single song list will be identified as the broadcast signal.

Figure 18:
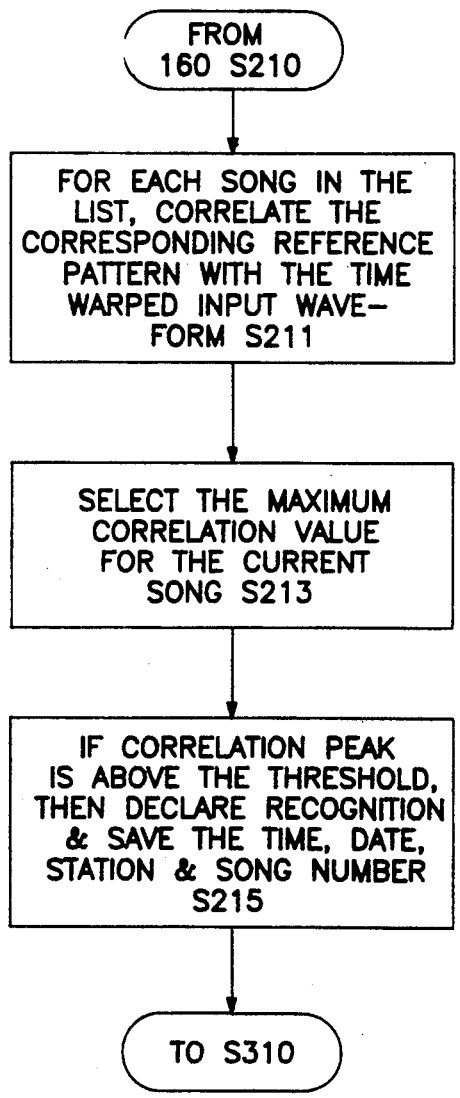
FIG. 18 is a flow chart showing the confirming step according to FIG. 16.

The second stage classification process is described in detail in the '562 patent at column 13, line 58 through column 15, line 57; and in FIGS. 2, 7, 8, 9, and 14. These portions of the '562 patent are specifically incorporated herein by reference. Basically, the song list or lists generated in the first stage classification process are submitted to the second stage correlator together with the signal $X_c(t)$ output in FIG. 2. The signal $X_c(t)$ may be linearly time warped, as discussed in the '562 patent. The Fourier transform of all five time warped and un-warped waveforms is calculated and provided as complex spectra which are compared with the second stage reference patterns stored in the second stage library. Samples from the digitized broadcast signals and the reference waveforms are cross multiplied and inverse Fourier transformed to provide a correlation signal (step S211 in FIG. 18). Next, the correlation functions between each second stage reference pattern and the plurality of time-warped (and un-warped) input signals are compared to select the maximum correlation value for the current input signal (step S213 in FIG. 18). The appropriate waveform with the highest correlation value is selected and compared to a threshold value which determines recognition. As soon as a correlation peak value is determined to be above the predetermined threshold, the signal is "recognized" (step S215 in FIG. 18), and the song identification is logged, and may be depicted on CRT 38.

Thus, the above-described system and method provides for an accurate, reliable, compact, yet inexpensive system for classifying signals.

As noted earlier, the apparatus according to the present invention may be used to generate the first and second stage reference libraries. The procedure for generating the first stage library has been described above, and the procedure for generating the second stage library is fully disclosed in the '562 patent, at column 15, line 64 through column 16, line 43. This portion of the '562 patent is also specifically incorporated herein by reference.

Therefore, what has been described above is apparatus and method for automatically classifying signals, and preferably broadcast signals. Since the system is microprocessor based, it can be realized in an extremely small and economical package. For example, the existing prototype comprises a commercial FM radio receiver and a small computer including a Sun 3/150 processor, a Sun CPU board using a Motorola 68020 microprocessor, a plurality of memory boards, a Mercury array processor, a preprocessor, a controller for the disk and peripherals, and a CRT. Those with skill in this field will readily understand the significant advancements in signal recognition disclosed in this patent While the present invention has been described in connection with what is presently considered to be the most practical and preferred embodiments, it is to be understood that the invention is not limited to the disclosed embodiments. To the contrary, the present invention is intended to cover various modifications and equivalent arrangements included within the spirit and the scope of the appended claims. The scope of the appended claims is to be accorded the broadest interpretation so as to encompass all such modifications and equivalent structures and functions.

What is claimed is:

1. A method of broadcast signal recognition, comprising the steps of:

receiving a broadcast signal and converting it into a plurality of electrical signals having different frequency bands;

sampling each of the plurality of electrical signals at a plurality of sampling points to produce a plurality of signal values for each frequency band;

calculating a plurality of statistical moments corresponding to the plurality of frequency bands, each statistical moment being calculated according to the formula:

$$(1/N) \sum_n \frac{(X(n) - \mu)^k}{\sigma^k}$$

where:
n = the number of sampling points;
n = 1 < n < N
X = the signal value of said electrical signal at a sampling point;
$\mu$ = a mean of the signal values;
$\sigma$ = a standard deviation of the signal values; and
k = an integer greater than 1;

recognizing the received signal as similar to at least one of said stored signal identifications when said comparison step produces an indication that the calculated statistical moments are similar to the at least one stored signal identifications, and outputting a signal indicating that the received broadcast signal is similar to the at least one stored signal identification.

2. A method according to claim 1 wherein said calculating step includes the steps of calculating skew and kurtosis values, and wherein said comparing step includes the step of forming a feature vector from said skew and said kurtosis.

3. A method according to claim 1 wherein said receiving step includes the steps of:

bandpass filtering the received broadcast signal to provide the plurality of electrical signals;

rectifying said plurality of electrical signals;

low pass filtering the rectified signals; and computing a plurality of linear combinations of the low pass filtered signals.

4. A method according to claim 3 wherein said sampling step includes the steps of:

sampling a first one of said linear combinations at the plurality of sampling points to produce a first plurality of signal values; and sampling a second one of said linear combinations at the plurality of sampling points to produce a second plurality of signal values.

5. A method according to claim 4 wherein said calculating step includes the steps of:

calculating a first skew value and a first kurtosis value from said first plurality of signal values;

calculating a second skew value and a second kurtosis value from said second plurality of signal values; and deriving a feature vector comprising said first and second skew values and said first and second kurtosis values.

6. A method according to claim 5 wherein said comparing step includes the steps of:

quantizing said feature vector in accordance with a plurality of predetermined quantization patterns to provide a quantized vector; and accessing said library with said quantized vector to locate a signal identification corresponding to the quantized vector.

7. A method according to claim 6 wherein said accessing step includes the steps of:

forming a weighted sum of the values of said quantized vector using a non-decimal radix;

using the weighted sum as an address to access a pointer table to locate a pointer corresponding to said weighted sum; and using said pointer to locate a signal identification list containing the signal identification corresponding to the quantized vector.

8. A method according to claim 7 wherein said recognizing step includes the steps of:

correlating a third one of said plurality of linear combinations with a plurality of stored signals which correspond to the signal identifications contained in said signal identification list; and selecting one stored signal whose correlation with said third linear combination exceeds a predetermined threshold.

9. A method according to claim 6 wherein said quantizing step includes the steps of:

categorizing each skew value of said feature vector in accordance with a predetermined skew quantization pattern having categories non-uniformly distributed therein; and categorizing each kurtosis value of said feature vector in accordance with a predetermined kurtosis quantization pattern having categories non-uniformly distributed therein.

10. A method of creating a signal library useful in broadcast signal recognition, comprising the steps of:

receiving a reference signal to be broadcast, and converting the reference signal into a plurality of electrical signals having different frequency bands;

sampling each of the plurality of electrical signals at a plurality of sampling points to produce a plurality of signal values for each frequency band;

calculating a plurality of statistical moments corresponding to the plurality of frequency bands using the plurality of signal values, each statistical moment being calculated according to the formula:

$$(1/N) \sum_n \frac{(X(n) - \mu)^k}{\sigma^k}$$

where:

N = the number of sampling points;

n = 1 < n < N

X = the sampled signal value at a sampling point;

$\mu$ = a mean of the sampled signal values;

$\sigma$ = a standard deviation of the sampled signal values; and k = an integer greater than 1;

deriving a feature vector from the calculated statistical moments; and storing the feature vector or a representation thereof in a broadcast signal memory.

11. A method according to claim 10 wherein said calculating step includes the step of calculating two statistical moments of the received reference signal, and wherein said deriving step includes the step of deriving said feature vector from both of the calculated statistical moments.

12. A method according to claim 10 wherein said receiving step includes the steps of:

bandpass filtering the received signal to provide the plurality of electrical signals;

rectifying said plurality of signals;

low pass filtering the rectified signals; and computing a plurality of linear combinations of the low pass filtered signals.

13. A method according to claim 12 wherein said sampling step includes the steps of:

sampling a first portion of one of said linear combinations at a plurality of points to produce a first plurality of signal values; and sampling a second portion of said one linear combination at a plurality of points to produce a second plurality of signal values.

14. A method according to claim 13 wherein said calculating step includes the steps of:

calculating the skew and kurtosis of said first plurality of signal values to provide a first skew value and a first kurtosis value; and calculating the skew and kurtosis of said second plurality of signal values to provide a second skew value and a second kurtosis value.

15. A method according to claim 14 wherein said deriving step includes the steps of:

forming a first feature vector including said first skew value and said first kurtosis value; and forming a second feature vector including said second skew value and said second kurtosis value.

16. A method according to claim 15, wherein said deriving step further includes the step of quantizing both said feature vectors by replacing the skew and kurtosis values with integers in accordance with predetermined non-uniform quantization pattern to produce first and second quantized vectors.

17. A method according to claim 16 wherein said storing step includes the steps of:

computing a weighted sum of said first vector using a non-decimal radix;

computing a weighted sum of said second vector using said non-decimal radix;

using the weighted sums to address said memory; and storing in said memory, at the addresses corresponding to the weighted sums, a signal identification code corresponding to said reference signal.

18. A method according to claim 15 wherein said deriving step further includes the steps of:

producing first and second overlap quantized vectors from said first feature vector in accordance with predetermined non-uniform overlap quantization patterns;

producing third and fourth overlap quantized vectors from said second feature vector in accordance with said predetermined non-uniform overlap quantization patterns;

forming a first plurality of permutations of said first and second overlap quantized vectors; and forming a second plurality of permutations of said third and fourth overlap quantized vectors.

19. A method according to claim 18 wherein said storing step includes the steps of:

computing a weighted sum of the values of each one of said first and second pluralities of permutations;

accessing said memory at addresses corresponding to said weighted sums; and storing in said memory, at areas corresponding to said addresses, a signal identification code identifying said reference signal.

20. A method of classifying a broadcast signal comprising the steps of:

receiving the broadcast signal and converting it into a plurality of electrical signals having different frequency bands;

sampling each of the plurality of electrical signals for each frequency band at a plurality of points to produce a plurality of signal values;

deriving a multi-value feature vector from said plurality of signal values derived from said plurality of electrical signals;

quantizing said feature vector by replacing each feature vector value with a category value determined from a predetermined quantization pattern which non-uniformly categorizes feature vector values; and accessing a predetermined broadcast signal library with the quantized vector and outputting from said library a signal identification code corresponding to the received signal.

21. A method according to claim 20 wherein said predetermined quantization pattern is an overlap quantization pattern.

22. A method according to claim 20, wherein said quantizing step utilizes a plurality of different predetermined quantization patterns to quantize said feature vector.

23. A method according to claim 20 wherein said deriving step includes the steps of:

calculating two different statistical moments of said plurality of signal values; and forming said feature vector using the two calculated statistical moments.

24. A method according to claim 23 wherein a predetermined quantization pattern is provided for each of the two statistical moments.

25. A method according to claim 23 wherein said two different statistical moments comprise skew and kurtosis.

26. A method according to claim 20 wherein said receiving step includes the step of envelope detecting said received signal.

27. A method according to claim 20 wherein said quantization step includes the steps of:

replacing said feature vector with a plurality of quantized vectors in accordance with at least one predetermined quantization pattern having overlapping categories; and permuting said plurality of quantized vectors to produce a further plurality of permutated quantized vectors.

28. A method according to claim 27 wherein said accessing step comprises the steps of:

accessing said signal library with said plurality of permuted quantized vectors to reach a plurality of memory locations; and writing in each said memory location a signal identification code corresponding to the received signal.

29. A method according to claim 20 wherein said receiving step includes the steps of:

spectrally analyzing said signal to provide the plurality of electrical signals having different frequency bands; and forming linear combinations of said plurality of electrical signals;

and wherein said sampling step includes the step of sampling each linear combination to provide a plurality of sampling points for each linear combination;

and wherein said deriving step includes the steps of:

calculating skew and kurtosis values for each linear combination from the corresponding sampling points; and forming said feature vector to include the skew and kurtosis values from all of said linear combinations.

30. A method of preparing a broadcast signal identification library useful in identification of broadcast signals, comprising the steps of:

receiving a signal to be broadcast and converting it into a plurality of electrical signals having different frequency bands;

sampling each of the plurality of electrical signals to provide a plurality of signal values for each frequency band;

deriving a plurality of multi-value feature vectors from said plurality of signal values;

quantizing each feature vector, including the substeps of:

establishing a plurality of quantization levels;

distributing the quantization levels non-uniformly over a predetermined statistical distribution of vector quantization values;

deriving a plurality of quantization thresholds in accordance with the distributed quantization levels; and replacing each value of each multi-value feature vector with a corresponding quantization value determined by said quantization thresholds; and storing, in a broadcast signal memory, a value representing each quantized vector as the signal identification for the corresponding received signal.

31. A method according to claim 30 wherein the step of distributing the quantization levels includes the step of distributing the quantization levels in an overlapped manner, and wherein the step of replacing each value of each feature vector includes the further steps of:

replacing each value of each feature vector with a plurality of quantization values determined by the overlapped quantization levels, each feature vector thus being replaced with a plurality of quantized vectors; and permuting the plurality of quantized vectors of each feature vector to produce a plurality of permuted vectors;

and wherein said step of storing includes the step of storing, for each sampled signal, values corresponding to the plurality of quantized vectors.

32. A method according to claim 30 wherein said deriving step includes the step of calculating, for each of the plurality of electrical signals, two statistical moments, and forming each feature vector to include the two statistical moments.

33. A method of identifying broadcast information, comprising the steps of:

receiving broadcast information and converting it into an electrical signal;

spectrally analyzing the electrical signal to produce a plurality of analyzed waveforms having different frequency bands;

forming a plurality of linear combinations of said analyzed waveforms;

computing at least one statistical moment for each said linear combination;

deriving a feature vector from the computed statistical moments;

quantizing the feature vector;

using the quantized feature vector to assess a broadcast signal memory storing a plurality of identifications of broadcast information; and identifying the received broadcast information based on the stored identifications, and outputting a signal corresponding to the received broadcast information.

34. A method according to claim 33 wherein said computing step includes the steps of:

sampling each analyzed waveform at a plurality of sampling points to provide a plurality of sampled values; and calculating, for each analyzed waveform, two different statistical moments according to the formula:

$$(1/N) \sum_n \frac{(X(n) - \mu)^k}{\sigma^k}$$

where:
    N = the number of sampling points;
    $n = 1 < n < N$
    X = the sampled value at a sampling point;
    $\mu$ = a mean of the sampled values;
    $\sigma$ = a standard deviation of the sampled values; and
    k = an integer greater than 1, a different value of k being provided for each of the two different statistical moments.

35. A method according to claim 34 wherein said deriving step includes the step of forming each feature vector to include values corresponding to each of the two calculated statistical moments.

36. A method according to claim 33 wherein said quantizing step includes the step of replacing each value of said feature vector with a quantization value derived from a predetermined non-uniform quantization pattern.

37. A method according to claim 36 wherein said using step includes the step of extracting from said memory a list of identifications of broadcast information, and wherein said identifying step includes the steps of:

correlating one of said analyzed waveforms with a plurality of information codes stored in a correlation library in said memory, the plurality of information codes corresponding to the list of identifications extracted in said using step; and declaring the broadcast information to be similar to one of the plurality of information codes when the correlation therebetween exceeds a predetermined threshold.

38. A method of classifying broadcast information, comprising the steps of:

receiving broadcast information and converting it into a received electrical signal;

performing a spectral analysis of said received electrical signal and providing a plurality of electrical signals having different frequency bands;

computing a plurality of linear combinations of said plurality of electrical signals;

calculating a statistical moment for each said linear combination; and classifying the received broadcast information based on the calculated statistical moments and a plurality of predetermined broadcast signal identifications stored in a broadcast signal memory.

39. A method according to claim 38 wherein said calculating step includes the steps of:

calculating two higher-order statistical moments of each said linear combination; and forming a feature vector incorporating the calculated statistical moments for each linear combination;

and wherein said classifying step includes the step of classifying the received broadcast information based on the formed feature vectors.

40. A method of classifying a broadcast signal comprising the steps of:

receiving the broadcast signal and converting it into an electrical signal;

bandpass filtering the converted electrical signal to provide a plurality of filtered signals having different frequency passbands;

rectifying and low pass filtering the filtered signals to provide a plurality of low bandwidth signals;

computing a plurality of linear combinations of said low bandwidth signals;

sampling several of the linear combinations to provide several sets of sampled values;

calculating a skew value and a kurtosis value for each set of sampled values;

forming a feature vector form the skew and kurtosis values of the several sets of sampled values;

quantizing the feature vector by replacing each skew and kurtosis value with a category value derived from a plurality of stored predetermined non-uniform quantization patterns;

using the quantized vector to access a first broadcast signal memory data base storing a plurality of signal identification lists, each list capable of storing a plurality of signal identification codes;

extracting from the first data base the signal identification list corresponding to the quantized vector;

extracting from a second data base stored correlation signals corresponding to the signals in the signal identification list extracted from the first data base;

correlating the extracted correlation signals with one of the linear combinations computed in said computing step; and classifying the broadcast information as similar to one of said correlation signals when its correlation with said one linear combination exceeds a predetermined threshold.

41. Broadcast signal recognition apparatus, comprising:

means for receiving a broadcast signal and converting it into a plurality of electrical signals having different frequency bands; and processing means for (a) sampling each of the plurality of electrical signals at a plurality of sampling points to produce a plurality of signal values for each frequency band, (b) calculating a plurality of statistical moments corresponding to the plurality of frequency bands using the plurality of signal values, each statistical moment being calculated according to the formula:

$$(1/N) \sum_n \frac{(X(n) - \mu)^k}{\sigma^k}$$

where:

N = the number of sampling points;
n = 1 < n < N
X = the signal value of said electrical signal at a sampling point;
$\mu$ = a mean of the signal values;
$\sigma$ = a standard deviation of the signal values; and
k = an integer greater than 1, (c) storing, in a broadcast signal memory, a library containing a plurality of stored signal identifications, (d) comparing the calculated statistical moments with the plurality of stored signal identifications in said library, and (e) recognizing the received signal as similar to one of said stored signal identifications when said comparison step produces an indication that the calculated statistical moments are similar to the at least one stored signal identification, and outputting a signal indicating that the received broadcast signal is similar to the at least one stored signal identification.

42. Apparatus according to claim 41 wherein said processing means calculates skew and kurtosis of said values, and forms a feature vector from said skew and said kurtosis.

43. Apparatus according to claim 41 wherein said processing means includes:

means for bandpass filtering the received broadcast signal to provide the plurality of filtered signals;
means for rectifying said filtered signals;
means for low pass filtering the rectified signals; and
means for computing a plurality of linear combinations of the low pass filtered signals.

44. Apparatus according to claim 43 wherein said processing means (a1) samples a first one of said linear combinations at the plurality of sampling points to produce a first plurality of signal values, and (a2) samples a second one of said linear combinations at the plurality of sampling points to produce a second plurality of signal values.

45. Apparatus according to claim 44 wherein said processing means (b1) calculates a first skew value and a first kurtosis value from said first plurality of signal values, calculates a second skew value and a second kurtosis value from said second plurality of signal values, and (b2) derives a feature vector comprising said first and second skew values and said first and second kurtosis values.

46. Apparatus according to claim 45 wherein said processing means (d1) quantizes said feature vector in accordance with a plurality of stored predetermined quantization patterns to provide a quantized vector, and(d2) accesses said library with said quantized vector to locate a signal identification corresponding t the quantized vector.

47. Apparatus according to claim 46 wherein said processing means (d2a) forms a weighted sum of the values of said quantized vector using a non-decimal radix, (d2b) uses the weighted sum as an address to access a pointer table stored in said library to locate a pointer corresponding to said weighted sum and uses said pointer to access said library to locate a signal identification list containing the signal identification corresponding to the quantized vector.

48. Apparatus according to claim 47 wherein said processing means (e1) correlates a third one of said plurality of linear combinations with a plurality of stored signals which correspond to the signal identifications contained in said signal identification list and (e2) selects one stored signal whose correlation with said third linear combination exceeds a predetermined threshold.

49. Apparatus according to claim 46 wherein said processing means (d1a) categorizes each skew value of said feature vector in accordance with a stored predetermined skew quantization pattern having categories non-uniformly distributed therein, and (d1b) categorizes each kurtosis value of said feature vector in accordance with a stored predetermined kurtosis quantization pattern having categories non-uniformly distributed therein.

50. Apparatus for creating a signal library useful in signal recognition comprising:

means for receiving a reference signal to be broadcast and converting it into a plurality of electrical signals having different frequency bands;
a broadcast signal memory;
processing means for (a) sampling each of said plurality of electrical signals at a plurality of sampling points to produce a plurality of signal values for each frequency band, (b) calculating a plurality of statistical moments corresponding to the plurality of frequency bands using the plurality of signal values, each statistical moment being calculated according to the formula:

$$(1/N) \sum_n \frac{(X(n) - \mu)^k}{\sigma^k}$$

where:

N = the number of sampling points;
n = 1 < n < N
X = the sampled signal value at a sampling point;
$\mu$ = a mean of the sampled signal values;
$\sigma$ = a standard deviation of the sampled signal values; and
k = an integer greater than 1, (c) deriving a feature vector from the calculated statistical moments, and (d) storing the feature vector or a representation thereof in said memory.

51. Apparatus according to claim 50 wherein said processing means calculates two statistical moments for each of the plurality of electrical signals, and derives each said feature vector from both of the calculated statistical moments.

52. Apparatus according to claim 50 wherein said processing means bandpass filters the received signal to provide the plurality of electrical signals, rectifies said filtered signals, low pass filters the rectified signals, and computes a plurality of linear combinations of the low pass filtered signals.

53. Apparatus according to claim 52 wherein said processing means (a1) samples a first portion of one of said linear combinations at a plurality of points to produce a first plurality of signal values, and (a2) samples a second portion of said one linear combination at a plurality of points to produce a second plurality of signal values.

54. Apparatus according to claim 53 wherein said processing means (b1) calculates the skew and kurtosis of said first plurality of signal values to provide a first skew value and a first kurtosis value, and (b2) calculates the skew and kurtosis of said second plurality of signal values to provide a second skew value and a second kurtosis value.

55. Apparatus according to claim 54 wherein said processing means (c1) forms a first feature vector including said first skew value and said first kurtosis value, and (c2) forms a second feature vector including said second skew value and said second kurtosis value.

56. Apparatus according to claim 55, wherein said processing means (c3) quantizes both said feature vectors by replacing the skew and kurtosis values with integers in accordance with predetermined non-uniform quantization patterns stored in said memory to produce first and second quantized vectors.

57. Apparatus according to claim 56 wherein said processing means (d1) computes a weighted sum of said first vector using a non-decimal radix, (d2) computes a weighted sum of said second vector using said non-decimal radix, (d3) uses the weighted sums to address said memory, and (d4) stores in said memory, at addresses corresponding to the weighted sums, a signal identification code corresponding to said reference signal.

58. Apparatus according to claim 55 wherein said processing means (c3) produces first and second overlap quantized vectors from said first feature vector in accordance with predetermined non-uniform overlap quantization patterns stored in said memory, (c4) produces third and fourth overlap quantized vectors from said second feature vector in accordance with said predetermined non-uniform overlap quantization patterns stored in said memory, (c5) forms a first plurality of permutations of said first and second overlap quantized vectors, and (c6) forms a second plurality of permutations of said third and fourth overlap quantized vectors.

59. Apparatus according to claim 58 wherein said processing means (d1) computes a weighted sum of the values of each one of said first and second pluralities of permutations, (d2) accesses said memory at addresses corresponding to said weighted sums, and (d3) stores in said memory, at areas corresponding to said addresses, a signal identification code identifying said reference signal.

60. Apparatus for classifying a broadcast signal comprising:
a receiver for receiving the broadcast signal and converting it into a plurality of electrical signals having different frequency bands;
a broadcast signal memory;
a processor for (a) sampling each of the plurality of electrical signals at a plurality of points to produce a plurality of signal values for each frequency band, (b) deriving a multi-value feature vector from said plurality of signal values derived from said plurality of electrical signals, (c) quantizing said feature vector by replacing each feature vector value with a category value determined from a predetermined quantization pattern which non-uniformly categorizes feature vector values, said pattern being stored in said memory, and (d) accessing a signal library with the quantized vector to output a signal identification code corresponding to the received signal, said library being stored in said memory.

61. Apparatus according to claim 60 wherein said predetermined quantization pattern is an overlap quantization pattern.

62. Apparatus according to claim 60, wherein said processor utilizes a plurality of different predetermined quantization patterns to quantize said feature vector.

63. Apparatus according to claim 60 wherein said processor (b1) calculates two different statistical moments of said plurality of signal values, and (b2) forms said feature vector using the two calculated statistical moments.

64. Apparatus according to claim 63 wherein a predetermined quantization pattern is provided for each of the two statistical moments.

65. Apparatus according to claim 63 wherein said two different statistical moments comprise skew and kurtosis.

66. Apparatus according to claim 60 wherein said processor envelope detects said received signal.

67. Apparatus according to claim 60 wherein said processor (c1) replaces said feature vector with a plurality of quantized vectors in accordance with at least one predetermined quantization pattern having overlapping categories, and (c2) permutes said plurality of quantized vectors to produce a further plurality of permutated quantized vectors.

68. Apparatus according to claim 67 wherein said processor (d1) accesses said signal library with said plurality of permutated quantized vectors to reach a plurality of memory locations, and (d2) writes in each said memory location a signal identification code corresponding to the received signal.

69. Apparatus according to claim 60 wherein said receiver (a) spectrally analyzes said received broadcast signal to provide a plurality of electrical signals having different frequency bands, and (b) forms linear combinations of said plurality of electrical signals;
and wherein said processor samples each linear combination to provide a plurality of sampling points for each linear combination, calculates skew and kurtosis values for each linear combination from the corresponding sampling points, and forms said feature vector to include the skew and kurtosis values from all of said linear combinations.

70. Apparatus for preparing a broadcast signal identification library useful in identification of broadcast signals, comprising:

receiver means for receiving a signal to be broadcast and converting it into a plurality of electrical signals having different frequency bands;

a broadcast signal memory;

a processor for (a) sampling each of the plurality of electrical signals to provide a plurality of signal values for each frequency band; (b) deriving a plurality of multi-value feature vectors from said plurality of signal values, and (c) quantizing each feature vector, including the substeps of:
(c1) establishing a plurality of quantization levels;
(c2) distributing the quantization levels non-uniformly over a predetermined statistical distribution of vector quantization values;
(c3) deriving a plurality of quantization thresholds in accordance with the distributed quantization levels; and
(c4) replacing each value of each multi-value feature vector with a corresponding quantization value determined by said quantization thresholds; and said processor (d) storing a value representing each quantized vector in said memory as the signal identification for the corresponding received signal.

71. Apparatus according to claim 70 wherein the quantization levels are distributed in an overlapped manner, and wherein said processor (c4a) replaces each value of each feature vector with a plurality of quantization values determined by the overlapped quantization levels, each feature vector thus being replaced with a plurality of quantized vectors, and (c4b) permutes the plurality of quantized vectors of each feature vector to produce a plurality of permuted vectors;

and wherein said processor (d1) stores in said memory, for each sampled signal, values corresponding to the plurality of quantized vectors.

72. Apparatus according to claim 70 wherein said processor (b1) calculates, for each of the plurality of electrical signals, two statistical moments, and (b2) forms each feature vector to include the two calculated statistical moments.

73. Apparatus for identifying broadcast information, comprising:
means for receiving broadcast information and converting it into an electrical signal;
a broadcast signal memory storing a plurality of identifications of broadcast information;
means for spectrally analyzing the electrical signal to produce a plurality of analyzed waveforms having different frequency bands; and
processing means for (a) forming a plurality of linear combinations of said analyzed waveforms, (b) computing at least one statistical moment for each said linear combination, (c) deriving a feature vector from the computed statistical moments, (d) quantizing the feature vector, (e) using the quantized feature vector to access said plurality of identifications of broadcast information stored in said memory, and (f) identifying the received broadcast information based on the stored identifications in said memory, and outputting an identification signal corresponding to the identified received broadcast information.

74. Apparatus according to claim 73 wherein said processor (b1) samples each analyzed waveform at a plurality of sampling points to provide a plurality of sampled values, and (b2) calculates, for each analyzed waveform, two different statistical moments according to the formula:

$$(1/N) \sum_n \frac{(X(n) - \mu)^k}{\sigma^k}$$

where:
N = the number of sampling points;
n = 1 < n < N
X = the sampled value at the sampling point;
$\mu$ = a mean of the sampled values;
$\sigma$ = a standard deviation of the sampled values; and
k = an integer greater than 1, a different value of k being provided for each of the two different statistical moments.

75. Apparatus according to claim 74 wherein said processor (c1) forms each feature vector to include values corresponding to each of the two calculated statistical moments.

76. Apparatus according to claim 73 wherein said processor (d1) replaces each value of said feature vector with a quantization value derived from a predetermined non-uniform quantization pattern stored in said memory.

77. Apparatus according to claim 76 wherein said processor (e1) extracts from said memory a list of identifications of broadcast information, and wherein said processor (f1) correlates one of said analyzed waveforms with a plurality of information codes stored in a correlation library in said memory, the plurality of information codes corresponding to the extracted list of identifications, and (f2) declares the broadcast information to be similar to one of the plurality of information codes when the correlation therebetween exceeds a predetermined threshold.

78. Apparatus for classifying broadcast information, comprising:
means for receiving broadcast information and converting it into an electrical signal; and
processing means for (a) performing a spectral analysis of said electrical signal and providing a plurality of electrical signals having different frequency bands, (b) computing linear combinations of said plurality of electrical signals analyzed waveforms, (c) calculating a statistical moment for each said linear combination, and (d) classifying the received broadcast information based on the calculated statistical moments and a plurality of predetermined broadcast signal identifications stored in a broadcast signal memory, and outputting an identification signal corresponding to the classified received broadcast information.

79. Apparatus according to claim 78 wherein said processor (c1) calculates two higher-order statistical moments of each said linear combination, (c2) forms a feature vector incorporating the calculated statistical moments, and (d1) classifies the received broadcast information base don the formed feature vector.

80. Apparatus for classifying a broadcast signal comprising:
a receiver for receiving the broadcast signal and converting it to an electrical signal;
a broadcast signal memory;
a computer for (a) bandpass filtering the converted electrical signal to provide a plurality of filtered signals having different frequency passbands, (b) envelope detecting and low pass filtering the filtered signals to provide a plurality of low bandwidth signals, (c) computing a plurality of linear combinations of said low bandwidth signals, (d) sampling several of the linear combinations to provide several sets of sampled values, (e) calculating a skew value and a kurtosis value for each set of sampled values, (f) forming a feature vector from the skew and kurtosis values of the several sets of sampled values, (g) quantizing the feature vector by replacing each skew and kurtosis value with a category value derived from a plurality of stored predetermined non-uniform quantization patterns stored in said memory, (h) using the quantized vector to access in said memory a first data base storing a plurality of signal identification lists, each list capable of storing a plurality of signal identification codes, (i) extracting from the first data base the signal identification list corresponding to the quantized vector, (j) extracting from a second data base stored in said memory correlation signals corresponding to the extracted signal identification list, (k) correlating the extracted correlation signals with one of the computed linear combinations, and (l) classifying the broadcast information as similar to one of said correlation signals when its correlation with said one linear combination exceeds a predetermined threshold, and outputting a signal corresponding to the classification.

* * * * *